(12) United States Patent
Fais et al.

(10) Patent No.: US 11,494,608 B2
(45) Date of Patent: Nov. 8, 2022

(54) METHODS AND APPARATUS TO TILE WALK A TENSOR FOR CONVOLUTION OPERATIONS

(71) Applicant: Intel Corporation, Santa Clara, CA (US)

(72) Inventors: Yaniv Fais, Tel Aviv (IL); Moshe Maor, Kiryat Mozking (IL)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 16/540,581

(22) Filed: Aug. 14, 2019

(65) Prior Publication Data
US 2019/0370631 A1 Dec. 5, 2019

(51) Int. Cl.
| | | |
|---|---|---|
| *G06N 3/02* | (2006.01) | |
| *G06N 3/04* | (2006.01) | |
| *G06F 17/15* | (2006.01) | |
| *G06F 8/41* | (2018.01) | |
| *G06N 3/063* | (2006.01) | |

(52) U.S. Cl.
CPC ............... *G06N 3/04* (2013.01); *G06F 8/41* (2013.01); *G06F 17/15* (2013.01); *G06N 3/063* (2013.01)

(58) Field of Classification Search
CPC ..................................................... G06N 3/02
See application file for complete search history.

(56) References Cited

U.S. PATENT DOCUMENTS

| | | | | |
|---|---|---|---|---|
| 10,635,951 | B1* | 4/2020 | Liu | G06V 40/172 |
| 11,321,092 | B1* | 5/2022 | Raikin | G06F 9/30196 |
| 2008/0159637 | A1* | 7/2008 | Citro | H04N 19/176 |
| | | | | 382/268 |
| 2009/0217275 | A1* | 8/2009 | Krishnamurthy | G06F 9/5077 |
| | | | | 718/102 |
| 2018/0018554 | A1* | 1/2018 | Young | G06N 3/063 |

OTHER PUBLICATIONS

Shankar, "What Does Stride Mean in the Context of Convolutional Neural Networks?" Quora, Aug. 10, 2017, 8 pages.

* cited by examiner

*Primary Examiner* — Jae U Jeon
(74) *Attorney, Agent, or Firm* — Hanley, Flight & Zimmerman, LLC

(57) ABSTRACT

An example apparatus to perform a convolution on an input tensor includes a parameters generator to: generate a horizontal hardware execution parameter for a horizontal dimension of the input tensor based on a kernel parameter and a layer parameter; and generate a vertical hardware execution parameter for a vertical dimension of the input tensor based on the kernel parameter and the layer parameter; an accelerator interface to configure a hardware accelerator circuitry based on the horizontal and vertical hardware execution parameters; a horizontal Iterator controller to determine when the hardware accelerator circuitry completes the first horizontal iteration of the convolution; and a vertical Iterator controller to determine when the hardware accelerator circuitry completes the first vertical iteration of the convolution.

29 Claims, 16 Drawing Sheets

NEURAL NETWORK TILE WALK

HARDWARE PARAMETERS DEFINING
TILE EDGES

HARDWARE PARAMETERS DEFINING
INPUT POINTER

HARDWARE EXECUTION PARAMETERS
DEFINING OUTPUT SIZE

```
// One-time calculation, per layer. Stored in kernel state, per information from the layer
parameters which kernel gets from the kernel parameters:

kernelState->tiles_in_width = (kernelParam->ofm_surface_width + kernelParam->ofm_tile_width
- 1) / kernelParam->ofm_tile_width;
    kernelState->tiles_in_height = (kernelParam->ofm_surface_height + kernelParam-
>ofm_tile_height - 1) / kernelParam->ofm_tile_height;
    kernelState->ofm_iters = (kernelParam->num_ofms + TNN_DEPTH - 1) >> LOG2_TNN_DEPTH;
    kernelState->ifm_cache_lines = ((kernelParam->num_ifms + ((512 >> kernelParam->I_data_type)
- 1)) << kernelParam->I_data_type) >> LOG2_BITS_IN_CACHELINE;
    kernelState->ifm_tile_depth_cache_lines = kernelParam->ifm_tile_depth >>
LOG2_BYTES_IN_CACHELINE;
    kernelState->ifm_tile_delta_depth_in_bytes = (kernelState->ifm_tile_depth_cache_lines-
kernelState->ifm_cache_lines)*NUM_BYTES_IN_CACHELINE;

uint32_t ofm_data_type = kernelParam->write_intermediate ? LOG2_INTERMEDIATE_ELEMENT :
kernelParam->be_data_type;
    kernelState->release_ifm_tile_is_needed = 1 - kernelParam->is_ifm_surf_fit_in_buf;
    kernelState->release_weights_tile_is_needed = 1 - kernelParam->is_weights_surf_fit_in_buf;
    kernelState->release_op_tile_is_needed = 1 - kernelParam->is_op_surf_fit_in_buf;
    kernelState->ofm_cache_lines_in_tile = ((kernelParam->num_ofms + ((512 >> ofm_data_type) -
1)) << ofm_data_type) >> LOG2_BITS_IN_CACHELINE;
```

FIG. 8A

```
// w_block is block size in cache lines of weights that support a single block of cache
line of IFMs
    kernelState->w_block = (kernelParam->kernel_width * kernelParam->kernel_height *
TNN_DEPTH);
    kernelState->w_lines = MAX (1,((kernelState->ifm_tile_depth_cache_lines + (((1 <<
kernelParam->I_data_type) - 1) >> kernelParam->W_data_type) ) << kernelParam->W_data_type >>
kernelParam->I_data_type));
    if (kernelParam->I_data_type >= kernelParam->W_data_type)
    {
        kernelState->ifm_increment = NUM_BYTES_IN_CACHELINE;
        kernelState->weight_increment = NUM_BYTES_IN_CACHELINE >> kernelParam->I_data_type <<
kernelParam->W_data_type;
    } else {
        kernelState->weight_increment = NUM_BYTES_IN_CACHELINE;
        kernelState->ifm_increment = NUM_BYTES_IN_CACHELINE >> kernelParam->I_data_type <<
kernelParam->W_data_type;
    }

// setting initial convolution center of first TNN block on the IFM surface:

kernelState->CCIL = (kernelParam->kernel_width >> 1) - kernelParam->ifm_pad_left;
kernelState->CCIU = (kernelParam->kernel_height >> 1) - kernelParam->ifm_pad_up;
```

FIG. 8B

```
// After receiving a tile of data, perform the following in firmware:

uint16_t ifm_tile_width_min_k = ifm_tile_width - (kernel_width >> 1);
    uint16_t ifm_tile_height_min_k = ifm_tile_height - (kernel_height >> 1);
    uint16_t num_ofms_trans = MINU (num_ofms - (ofm_iter << LOG2_TNN_DEPTH), TNN_DEPTH);
    IFM_delta = ((ifm_conv_stride_x * TNN_WIDTH * ifm_tile_depth_cache_lines) -
ifm_tile_depth_cache_lines) << 6 ;
    OFM_delta = TNN_WIDTH * ofm_cache_lines_in_tile;

// Prepare the X (horizontal) hardware parameters, which leverage the symmetry along the tile as
the tile walking goes from top to bottom:

for (x = 1 + (kernel_width >> 1); (x <= ifm_tile_width_min_k) && (CCOL <
ofm_surface_width_conv);) {
        blockx = MINU ((ifm_tile_width_min_k - x + ifm_conv_stride_x) / ifm_conv_stride_x,
ofm_surface_width_conv - CCOL);
        blockx = MINU (blockx, TNN_WIDTH);
        CCIR = CCIL + (blockx - 1) * ifm_conv_stride_x;
        edgeL = MIN (CCIL, TNN_MAX_EDGE);
        edgeR = MINU(ifm_surface_width - CCIR - 1, TNN_MAX_EDGE);
        edgeRL[Xblocks] = ((edgeR << 8) | (((uint16_t)edgeL)&0xff)) << 4;
        CCIL += blockx * ifm_conv_stride_x;
        CCOL += blockx;
        deltax += blockx;
        x += blockx * ifm_conv_stride_x;
        blocksx[Xblocks] = blockx;
        Xblocks++;
    }

CCIL -= deltax * ifm_conv_stride_x;
    CCOL -= deltax; // delaying CCOL update
```

FIG. 8C

```
// Continue counting the non-real delta-x until end of the tile,
// to enable counting a pre-pad in cases where there are two rightmost tiles.
// This affects only the deltax value, without actually generating any
// further execution commands as the commands are implicit.
// The below while loop executed only in cases that reach boundary of number
// of pre-elements [CCOL]
while (x <= ifm_tile_width_min_k) {
    blockx = MINU((ifm_tile_width_min_k - x + ifm_conv_stride_x) / ifm_conv_stride_x,
ofm_surface_width_conv - CCOL);
    blockx = MINU(blockx, TNN_WIDTH);
    deltax += blockx;
    x += blockx * ifm_conv_stride_x;
}
```

FIG. 8D

```
/*
 * Looping over the OFM tile.
 * The assumption is that all required IFM and W information exists in the BID.
 * Tile walk is assumed to be static: horizontal major inside the OFM tile [blocks].
 * Assuming one batch of tiles is exactly enough to generate 16 OFMs
 * most internal walk is over the batches of 16 OFMs.
 */ deltay = 0;

firstRow = 1;
for (y = 1 + (kernel_height >> 1); (y <= ifm_tile_height_min_k) && (CCOU <
ofm_surface_height_conv);) { uint32_t temp_IFM_UL_sp_base = IFM_UL_sp_base;
    uint32_t temp_OFM_UL_sp_base = OFM_UL_sp_base + ofm_cacheline_offset;
    uint32_t block_counter = 0; // used to inform TNN block number of blocks, at end of
first row of blocks in the tile
        blocky = MINU((ifm_tile_height_min_k - y + ifm_conv_stride_y) / ifm_conv_stride_y,
ofm_surface_height_conv - CCOU);
        blocky = MINU(blocky, TNN_HEIGHT);

new_row = 1;
    CCID = CCIU + (blocky - 1) * ifm_conv_stride_y;
    edgeU = MIN(CCIU, TNN_MAX_EDGE);
    edgeD = MINU(ifm_surface_height - CCID - 1, TNN_MAX_EDGE);
```

FIG. 8E

```
for (x = 0; x < Xblocks; x++) {
    for (i = 0; i < ifm_cache_lines; i++, evict_flag++) {
        uint16_t num_ifms_trans = MINU(temp_num_ifms, ifms_in_cache_line);
        send HW param (num_ifms_trans);// IFM_sizeZ in elements send HW param( edgeRL[x] | edgeD);          // Right boundary
        send HW param(edgeU);// IFM edgeU
        send HW param(temp_IFM_UL_sp_base);// IFM_UL_sp_base send HW param(ofm_write_mode);// OFM format
        send HW param(num_ofms_trans);// OFM sizeZ
        send HW param(ofm_line_offset);// OFM line offset
        send HW param(MAX(evict_flag, 0));// OFM evict
        send HW param(temp_OFM_UL_sp_base);// INTERMEDIATE UL sp base
        send HW param(temp_OFM_UL_sp_base);// OFM_UL_sp_base
        send HW param(blocky);// OFM blockY
        send HW param(blocksx[x]);// OFM blockX
        send HW param(temp_W_UL_sp_base);// W_UL_sp_base
        send HW param(operand_delta);// operand delta
        send HW param(new_row);// Set to '1' for the first block in a row of
        blocks inside a tile.
        send HW param(MINU(i, 1));// bias_op. in first iteration should be 0
        otherwise '1' temp_IFM_UL_sp_base += ifm_increment;
        temp_W_UL_sp_base += weight_increment;
        temp_num_ifms -= ifms_in_cache_line;
    } temp_IFM_UL_sp_base += kernelState->ifm_tile_delta_depth_in_bytes;
    temp_IFM_UL_sp_base += IFM_delta;
    temp_OFM_UL_sp_base += OFM_delta;
    new_row = 0;
    block_counter++;

} // X iteration
```

```
        IFM_UL_sp_base = CVE_UPDATE_PTR(IFM_UL_sp_base, (ifm_tile_depth_cache_lines *
ifm_tile_width * TNN_HEIGHT * ifm_conv_stride_y) << 6);
        updateCBATlineInplace(OFM_UL_sp_base, TNN_HEIGHT * ofm_cache_lines_in_tile *
ofm_tile_width, OFM_BID);
        CCIU += blocky * ifm_conv_stride_y;
        CCOU += blocky;
        deltay += blocky;
        y += blocky * ifm_conv_stride_y;
    }
    // Current tile of work is complete.
    // Move location up to Y starting point of that tile.
    CCIU -= deltay * ifm_conv_stride_y;
    CCOU -= deltay;
```

```
// Perform for deltay the same operations performed for deltax...
while (y <= ifm_tile_height_min_k) {
    blocky = MINU((ifm_tile_height_min_k - y + ifm_conv_stride_y) / ifm_conv_stride_y,
ofm_surface_height_conv - CCOU);
    blocky = MINU(blocky, TNN_HEIGHT);
    deltay += blocky;
    y += blocky * ifm_conv_stride_y;

ofm_iter++;
    ofm_line_offset += TNN_DEPTH;
    if ((ofm_line_offset % ofms_in_cache_line) == 0) {
        ofm_cacheline_offset += (ofm_line_offset / ofms_in_cache_line);
        ofm_line_offset = 0;
    } if (ofm_iter == ofm_iters) {
        // update pointers...
        op_line_offset = 0;
        ofm_line_offset = 0;
        ofm_iter = 0;
        ofm_cacheline_offset = 0;
        // Move the ccil/ccol indices to the right, i.e.:
        CCIL += (deltax - pooling_size + pooling_stride) * ifm_conv_stride_x;
        CCOL += deltax - pooling_size + pooling_stride;
        ifm_tile_index_x++;
        if (ifm_tile_index_x == tiles_in_width) {
            ifm_tile_index_x = 0;
            ifm_tile_index_y += 1;
            CCIU += (deltay - pooling_size + pooling_stride) * ifm_conv_stride_y;
            CCOU += deltay - pooling_size + pooling_stride;
            deltay = 0;
            CCIL = (kernel_width >> 1) - kernelParam->ifm_pad_left;
            CCOL = 0;
        }
    }
}
```

METHODS AND APPARATUS TO TILE WALK A TENSOR FOR CONVOLUTION OPERATIONS

FIELD OF THE DISCLOSURE

This disclosure relates generally to computer processing, and more specifically to tile walking of a tensor for convolution operations.

BACKGROUND

Artificial intelligence (AI), machine learning (ML), and deep learning (DL) models use neural networks to perform convolutions on data to recognize features on that input data. The input data can be large sets of data referred to as tensors. Tensors store cells of data that represent characteristics of subjects (e.g., images, video, audio, radar imaging, etc.) analyzed by the AI, ML, and/or DL models (sometimes referred to herein as AI/ML/DL models). In this manner, AI/ML/DL models use convolutions to perform feature recognition processes to recognize features in different types of data in input tensors. Through such convolutions, a neural network can generate a probability value or probability values indicative of likelihoods that one or more features are present in the input data. In this manner, a device or computer can use the probability values to confirm that the feature or features with the highest probability or probabilities is/are present in the input data.

BRIEF DESCRIPTION OF THE DRAWINGS

FIGS. 8A-8H include example lines of code (LOCs) representing machine readable instructions that may be executed to perform convolutions of input tensors based on hybrid firmware-hardware tile walking in accordance with examples disclosed herein.

Figure 1:
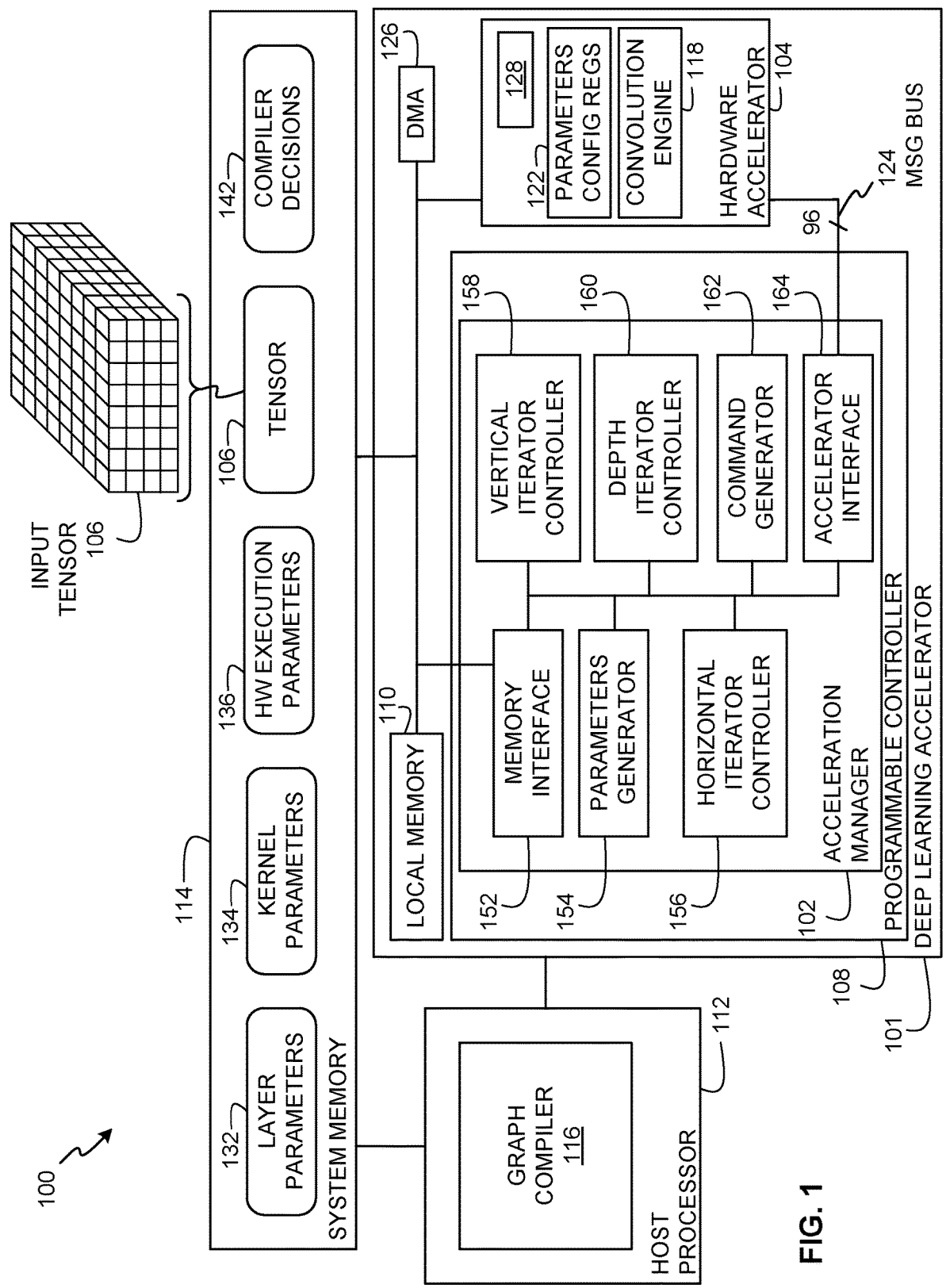
FIG. 1 illustrates an example acceleration manager and an example hardware accelerator to perform convolutions of input tensors based on hybrid firmware-hardware tile walking.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained during a training phase with data to recognize patterns and/or associations. During a recognition phase, the model follows such patterns and/or associations when processing input data such that other input(s) result in output(s) consistent with the recognized patterns and/or associations from the training phase. Applications that employ AI, ML, DL, and/or other artificial machine-driven logic involve a number of computational processes. Examples of such computational processes include convolution operations of input tensors in order to numerically recognize and detect features in input data. For example, input data to an AI/ML/DL model may be an image (or any other data) represented using a multi-dimensional tensor of cell values. Such cell values represent characteristics of the input data to be analyzed for possible recognition by the AI/ML/DL model. As part of such analysis, the AI/ML/DL model can employ filters, some of which are implemented by convolution engines. During a training phase, different weights are selected for different nodes of a filter by learning what weight values and or combinations of weight values produce acceptable results by the AI/ML/DL model. During a recognition phase, such weight values are convolved with cell values of an input tensor so that the convolution engine can emphasize and/or filter out different characteristics about the input data based on the training of the AI/ML/DL model during the training phase. However, for a large input tensor, performing such convolutions purely in software or firmware can be resource prohibitive due to the number of execution cycles and, thus, time, needed to process the entire input tensor.

Examples disclosed herein provide a hybrid firmware-hardware technique to perform convolution operations on input tensors. For example, techniques disclosed herein partition an input tensor into multiple tiles and use a combination of firmware and hardware acceleration to perform multiple per-tile convolution operations by tile walking the tiles of the input tensor. Examples disclosed herein can be used to implement hardware acceleration of DL algorithms for use in AI applications. Examples disclosed herein may be implemented using a Ternary neural network (TNN) model or architecture (e.g., a hardware accelerator to implement convolutions over binary and ternary data-precision values). In examples disclosed herein, a TNN is a convolutional neural network (CNN) model or architecture structured to analyze input data (e.g., input tensors). Examples disclosed herein may be implemented using an Intel® Nervana™ Neural Network Processor for Inference (NNP-I) which includes 12 inference computation engine (ICE) low-precision deep-learning accelerators, one or more of which can implement a TNN. Additionally or alternatively, examples disclosed herein may be implemented using any other suitable type of AI/ML/DL model and/or AI/ML/DL architecture.

A tensor is a data structure used to organize data in arrangements representing one or more dimensions. For example, an array may be a one-dimensional tensor (e.g., a vector), and a two-dimensional matrix may be a two-dimensional tensor (e.g., (x,y)). However, tensors become significantly more complex and useful in the area of AI and deep learning when used to organize data in three or more dimensions to represent, for example, real-world characteristics as input data into a deep learning model. When performing tensor mathematics, a tensor can be partitioned into multiple smaller tiles, and the smaller tiles can be individually processed to achieve processing of the entire tensor. As used herein, a tile is a subset of cell values of a corresponding larger tensor. For example, the tile can have a substantially similar three-dimensional structure as the corresponding larger tensor, but the tile has smaller dimension sizes (e.g., smaller horizontal (X), vertical (Y), and/or depth (Z) dimensions) and only a subset of the cell values of the larger tensor. In addition, as described below, a tile can be partitioned into smaller micro-tiles that can have a substantially similar three-dimensional structure as the corresponding larger tile, but the micro-tile has smaller dimension sizes (e.g., smaller horizontal (X), vertical (Y), and/or depth (Z) dimensions) and only a subset of the cell values of the larger tile. As such, a tensor includes multiple tiles, and each tile includes multiple micro-tiles. Processing of a tensor as smaller tiles and/or micro-tiles as disclosed herein is referred to herein as tile walking. To tile walk a tensor, multiple nested loops may be used to iteratively process the multiple tiles of the tensor by accessing tensor data for each tile from memory, and performing tensor operations on a tile-by-tile basis until the tile walking has resulted in processing all tiles of the tensor. In some examples, tiles can be processed in parallel to process the entire tensor faster.

Examples disclosed herein perform two-level data tile walking to perform convolutions on tiles of an input tensor such that the complex part of the tile walk is implemented in firmware that can be programmed and/or compiled to run on a scalar digital signal processor (DSP) (e.g., an application-specific instruction set processor (ASIP)) that is in communication with a hardware accelerator that implements a convolution engine. Examples disclosed herein employ the convolution engine in the hardware accelerator to perform the more detailed, cell-value-based tile walking for tiles of the input tensor. This enables the firmware to have flexibility for configuring/managing complex tile walks for different scenarios (e.g., different input tensor dimensions, different data types, different types of convolutions, etc.) while providing high-efficiency executions of hardware to perform numerical processing-intensive operations when convolving cell values of tiles with different weight values. In examples disclosed herein, an input tensor can be partitioned into smaller tiles, and the tiles can be partitioned into micro-tiles or execution blocks (also referred to herein as blocks) (e.g., 2×2 micro-tiles, 4×4 micro-tiles, etc.), and the hardware accelerator can manage the smaller tiles under the direction or specific definitions provided by the firmware via multiple parameters. In examples disclosed herein, the firmware 'understands' the bigger picture of the multiple tiles that form the entire input tensor. In examples disclosed herein, the firmware 'understands' the bigger picture in that the firmware is provided with dimensions and/or characteristics of the entire input tensor, the firmware partitions the input tensor into smaller tiles and/or micro-tiles, and the firmware manages processing of the tiles/micro-tiles by coordinating how the hardware accelerator is to perform convolution on each tile/micro-tile so that the end result is a convolution of the entire tensor managed by the firmware. In managing such convolutions of input tensors, the firmware can support complex features such as padding tile data, specifying different walk patterns based on input tensor sizes, specifying different convolution strides based on input tensor sizes, etc.

FIG. 1 is an example system 100 including an example deep learning accelerator 101 that includes an example acceleration manager 102 and an example hardware accelerator 104 to perform convolutions of input tensors (e.g., an input tensor 106) based on hybrid firmware-hardware tile walking. In the example of FIG. 1, the example acceleration manager 102 is implemented by an example programmable controller 108. The example programmable controller 108 may be implemented using a DSP, an ASIP, and/or any other suitable programmable device (e.g., controller or processor) capable of executing firmware instructions in accordance with teachings of this disclosure. The example deep learning accelerator 101 also includes a local memory 110 (e.g., static random access memory (SRAM), dynamic random access memory (DRAM), etc.) which may be implemented as on-chip memory or as memory in the same chip package as the deep learning accelerator 101. Also in the example of FIG. 1, the system 100 includes an example host processor 112 and example system memory 114. As shown in FIG. 1, the deep learning accelerator 101 and the host processor 112 are in communication with the system memory 114. The example host processor 112 includes an example graph compiler 116, which may be implemented as software executed by the host processor 112. The example graph compiler 116 compiles graph representations of software code, parameters, and/or data for use by the acceleration manager 102 and/or the hardware accelerator 104 to implement AI/ML/DL models. For example, as described in more detail below, the graph compiler 116 interprets input parameters corresponding to input tensors and generates additional parameters for use by the acceleration manager 102 to manage hybrid firmware-hardware tile walking handled by the acceleration manager 102 and the hardware accelerator 104. In some examples, the graph compiler 116 can perform its processes ahead of time, possibly on a different system separate from the system 100. In such examples, the results of the graph compiler 116 are a compiled workload of parameters (e.g., layer parameters 132 and/or kernel parameters 134) and/or compiler decisions (e.g., the compiler decisions 142) can be loaded by the host processor 112 for access by the deep learning accelerator 101. For example, the host processor 112 can load the compiled workload of parameters and/or compiler decisions into the system memory 114 for access by the deep learning accelerator 101 and/or can provide the compiled workload directly to the deep learning accelerator 101.

The example hardware accelerator 104 is circuitry (e.g., hardware accelerator circuitry) implementing an accelerator for deep-learning convolution operations. For example, the hardware accelerator 104 may be implemented using logic circuitry (e.g., an integrated circuit (IC), an application specific integrated circuit (ASIC), a field programmable gate array (FPGA), a programmable logic device (PLD), etc.). Although a single hardware accelerator 104 is shown in FIG. 1, the example deep learning accelerator 101 may be provided with multiple hardware accelerators substantially similar or identical to the hardware accelerator 104. In such examples, the multiple hardware accelerators 104 may be used to perform convolution operations on multiple tiles/micro-tiles in parallel. To implement convolution operations, the hardware accelerator 104 is provided with an example convolution engine 118. In addition, the hardware accelerator 104 is provided with example parameters configuration registers 122 in which parameters from the acceleration manager 102 are stored to configure the convolution engine 118 to perform convolution operations on tiles from the input tensor 106. Although a single convolution engine 118 is shown in FIG. 1, in other examples, the hardware accelerator 104 may be provided with multiple convolution engines 118 to perform convolution operations on multiple tiles/micro-tiles in parallel. In the illustrated example of FIG. 1, to program the parameters configuration registers 122, the acceleration manager 102 is in communication with the hardware accelerator 104 via an example message bus 124 (e.g., a control bus). In the illustrated example, the message bus 124 is 96 bits wide. However, the example message bus 124 can be of any other suitable bit-width. In the illustrated example of FIG. 1, the acceleration manager 102 programs and controls operation of the hardware accelerator 104 via the example message bus 124. For example, the acceleration manager 102 communicates command messages to the hardware accelerator 104. The command messages define neural network compute structure parameters for programming and/or storing in the parameters configuration registers 122. In examples disclosed herein, the command messages include parameters such as address pointers from the acceleration manager 102 to inform the hardware accelerator 104 of memory addresses at which data (e.g., cell values) of tiles are located in the local memory 110. In this manner, the hardware accelerator 104 can access the data of tiles from the local memory 110 so that the convolution engine 118 can walk the tiles to perform convolution operations to convolve the input tensor 106 (or portions thereof) with one or more weight values. Other example parameters communicated by the acceleration manager 102 to the hardware accelerator 104 are described below. By providing the hardware accelerator 104 (e.g., the convolution engine 118 and the parameters configuration registers 122) as hardware circuitry implemented separate from the acceleration manager 102, the acceleration manager 102 can be freed up from performing complex convolution operations that are instead offloaded to the hardware accelerator 104 which is structured to perform such convolution operations in an efficient manner. In addition, by providing the deep learning accelerator 101 (e.g., the acceleration manager 102 and the hardware accelerator 104) separate from the host processor 112, the host processor 112 is freed up from managing convolutions and/or performing convolution operations that are instead offloaded to the deep learning accelerator 101 (e.g., the managing of convolutions performed by the acceleration manager 102 and the convolution operations performed by the hardware accelerator 104).

In the example of FIG. 1, the system 100 includes an example direct memory access (DMA) controller 126. The example DMA controller 126 may be used to provide the deep learning accelerator 101 with direct memory access to directly copy tile data from memory locations in the system memory 114 to memory locations of the local memory 110 of the deep learning accelerator 101. In this manner, retrieval of tile data from the system memory 114 can be performed directly by the deep learning accelerator 101 (e.g., using the DMA controller 126 without such data needing to be relayed or accessed through the example programmable controller 108 and/or the example host processor 112). In this manner, data access speeds are increased by use of the DMA controller 126. In some examples, memory address locations of tile data may be provided to the DMA controller 126 by the acceleration manager 102 and/or the host processor 112. Additionally or alternatively, such memory address locations of the tile data may be provided to the DMA controller 126 by the hardware accelerator 104 based on address pointers programmed into the parameters configuration registers 122. In examples disclosed herein, the DMA controller 126 is managed by a DMA program that is part of the compiled workload generated by the graph compiler 116 (e.g., the DMA program may be part of the compiler decisions 142). In this manner, by generating the DMA program, the graph compiler 116 can control a specific walk to be implemented by the hardware accelerator 104 to perform a convolution on the input tensor 106. Based on the DMA program, the DMA controller 126 autonomously fetches tiles from the input tensor 106 stored in the system memory 114, loads the tile data into the local memory 110, and signals the acceleration manager 102 (e.g., firmware) that the input tile data is available in the local memory 110. In examples disclosed herein, the DMA controller 126 also copies kernel data (e.g., weights data) for convolutions from the system memory 114 to the local memory 110 based on the DMA program for access by the hardware accelerator 104. Also in examples disclosed herein, the DMA controller 126 copies output data generated by the hardware accelerator 104 from the local memory 110 to the system memory 114 to store output tensors in the system memory 114. In other examples, the DMA controller 126 may be omitted, and the example programmable controller 108 and/or the example host processor 112 may perform data retrieval operations from the system memory 114, and store the retrieved data in the local memory 110 and/or provide the retrieved data to the hardware accelerator 104. In such examples, the example programmable controller 108 and/or the example host processor 112 also copies output data from the local memory 110 to the system memory 114.

Figure 2:
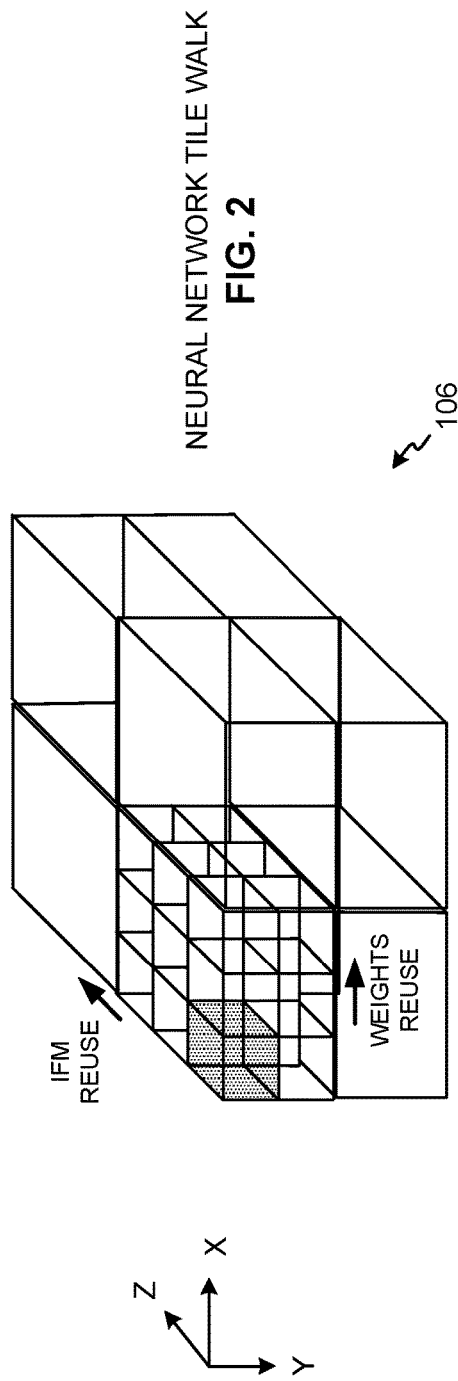
FIG. 2 is the example input tensor of FIG. 1 showing horizontal, vertical, and depth dimensions for a neural network tile walk.

Turning briefly to FIG. 2, the example input tensor 106 of FIG. 1 is shown in more detail to emphasize a horizontal (X) dimension, a vertical (Y) dimension, and a depth (Z) dimension for a neural network tile walk. Example tile walking disclosed herein is performed using multi-channel two-dimensional convolutional layers (e.g., Multi-Channel Conv2D). In such examples, output data (e.g., an output feature map (OFM)) is a three-dimensional (3D) structure that is computed by the acceleration manager 102 and the hardware accelerator 104 of FIG. 1 from 3D input data (e.g., an input feature map (IFM)) convoluted with four-dimensional (4D) weight values. The example input tensor 106 may be very large. By partitioning the input tensor 106 into multiple smaller tiles, the smaller tiles can be copied to an example cache 128 in the hardware accelerator 104 to perform convolution operations. In examples disclosed herein, convolutions are performed by convolving a layer of cell values of a tile with weight values. For example, this can be done by performing multiple iterations of convolutions on a per-layer basis until the hardware accelerator 104 completes convolutions of all layers of a tile. In the example of FIG. 2, a layer of the input tensor 106 is defined as the cell values running along the horizontal (X) dimension and the vertical (Y) dimension. In such tile structure configuration, multiple layers are arranged along the depth (Z) direction. To reuse as much locally cached tile data as possible during convolution operations, the acceleration manager 102 processes tensors of different dimensions using different types of tile walking structures as is most suitable for higher cache data reuse. Examples of different tile walk structures include a batch walk structure, an input reuse walk structure, and a weight reuse walk structure. In an example batch walk structure, an additional dimension is added to the weight values of the convolution so that the convolution can convolve two layers of a tile with respective weight values at the same time. An example input reuse walk structure involves re-using previous input data (e.g., IFM data) of a tile layer when computing output data (e.g., OFM data) along the depth (Z) dimension (e.g., as generally shown in FIG. 2 by the arrow labeled "IFM reuse"). An example weight reuse walk structure involves reusing weight values for multiple tile layers (e.g., as generally shown in FIG. 2 by the arrow labeled "weights reuse") when computing output data (e.g., OFM data) in the horizontal (X) dimension and the vertical (Y) dimension. In other examples, any other suitable combination of walk structure may be used, and may be based on the dimensions and edges of the tiles.

The example of FIG. 2 shows the input tensor 106 partitioned into multiple smaller 3D tiles and micro-tiles (e.g., 4×4 micro-tiles in the example of FIG. 2). The example convolution engine 118 (FIG. 1) walks the smaller tiles (e.g., processes the smaller tiles stored in the local memory 110 rather than attempting to process the tensor as a whole at one time) to more efficiently process the larger input tensor 106 stored in the system memory 114. The acceleration manager 102 (FIG. 1) takes multiple parameters into account to split responsibilities of the tile walk between the hardware accelerator 104 and firmware that implements the acceleration manager 102. That is, the complexities of splitting responsibilities of the tile walk involve splitting the walk into a two-level tile walk that includes a firmware-based portion of the walk (e.g., a first level of the two-level tile walk and a hardware-based portion of the walk (e.g., a second level of the two-level tile walk). In this manner, examples disclosed herein implement hardware-assisted firmware to perform hybrid firmware-hardware convolution operations. To improve performance, the acceleration manager 102 handles the complex management part of the walk in firmware to generate parameters and commands to control the hardware accelerator 104 to perform the recursive and mathematically intensive convolution part of the walk. In examples disclosed herein, the firmware-based acceleration manager 102 provides commands to configure the hardware accelerator 104 to convolve a sufficient amount of input data (e.g., a tile size or numbers of tiles) so that the hardware accelerator 104 does not finish and stall too early before the firmware-based acceleration manager 102 can provide the next input data for convolution. In this manner, performance of example hybrid firmware-hardware tile walking techniques disclosed herein can be improved by increasing (e.g., maximizing) throughput of both the firmware-based operations and hardware-based operations. Increasing (e.g., maximizing) such throughput involves reducing (e.g., minimizing) stalling of the firmware-based acceleration manager 102 between hardware-based convolution operations and reducing (e.g., minimizing) stalling of the hardware accelerator 104 during between firmware-based management operations. For example, to increase the likelihood that the hardware accelerator 104 runs convolution operations in a substantially continuous manner, while the hardware accelerator 104 is performing a current convolution operation, the acceleration manager 102 calculates a next operation that the hardware accelerator 104 is to perform. The acceleration manager 102 then instructs the hardware accelerator 104 regarding the next operation by sending the hardware accelerator 104 a command message via the message bus 124 (e.g., in a first in first out (FIFO) fashion). As such, in a steady state of the system 100, detailed instructions about a next operation are ready for the hardware accelerator 104 on an ongoing basis to process next micro-tiles waiting in, for example, a FIFO buffer in the local memory 110. In this manner, high utilization of the hardware accelerator 104 is leveraged by keeping it busy with pipelined commands for processing incoming micro-tiles, which provides high processing performance to the overall system 100.

Returning to FIG. 1, the example system memory 114 stores example layer parameters 132, example kernel parameters 134, and example hardware execution parameters 136 (e.g., hardware parameters 136). The example layer parameters 132 define operational characteristics for processing the input tensor 106 and structural characteristics of the input tensor 106. In examples disclosed herein, the layer parameters are defined or set based on the input tensor 106 and apply to the entire tensor convolution to be performed on the input tensor 106. The example layer parameters 132 include one or more of an example operation parameter, an example input dimension sizes parameter, an example output dimension sizes parameter, an example data type parameter, an example kernel (filter) size parameter, an example padding mode parameter, an example IFM stride parameter, example pooling mode/size/stride parameters, and example quantization and activation parameters. The example operation parameter defines the type of compute operation to be performed on the input tensor 106 which may include, for example, a convolution operation, a pooling operation, a fully-connected operation, etc. The example input and output dimension sizes parameters define the horizontal (X) dimension sizes, vertical (Y) dimension sizes, and depth (Z) dimension sizes for input tensors to be convolved and for output tensors to be generated by the convolution processes.

The example data type parameter defines the data type of the input tensor data (e.g., IFM data), the weight values, and the output tensor data (e.g., OFM). The data type is indicative of how many bits per cell are used to represent cell values of input tensors. Example data types for input tensor data, weight values, and output tensor data are INT1 (e.g., one bit per cell), INT2 (e.g., two bits per cell), INT4 (e.g., four bits per cell), and INT8 (e.g., eight bits per cell). In some examples, the data types are signed integer values (e.g., eight bits represents a numeric range of −128 to 127). In addition, an example data type for the output tensor data is INT32 (e.g., 32 bits per cell). The INT32 data type for output tensor data can be used for cases in which multiplying input data and weights during convolution produces large output values that need to be represented by more bits (e.g., 32 bit integer values) than the number of bits per cell value representing the input data. However, in some examples, quantization operations can be performed on the output data to reduce the number of bits used to represent the resulting output data (e.g., by truncating least significant bits). Through quantization, output data bit values per cell can remain at lower bit ranges of INT1, INT2, INT4, and/or INT8, but at lower precision than using more bits per cell value. Thus, using more bits per cell value provides higher precision but also requires more memory capacity. Alternatively, using fewer bits per cell value decreases precision but requires less memory capacity to store tile data.

The example kernel (filter) size parameter defines the number of horizontal (X) dimension taps and the number of vertical (Y) dimension taps to configure into the convolution engine 118 to perform convolution operations. The example padding mode parameter is used to specify how much, if any, padding data needs to be added in any dimension to generate an output tensor. For example, padding data can be used when one or more dimensions of an input tensor is/are smaller than intended dimension size(s) of an output tensor. The example IFM stride parameter specifies whether a compute operation (e.g., a convolution) is to be performed by working on any input value from the IFM or whether to hop two or more elements between convolution operations. This parameter can be used by the acceleration manager 102 to manage the sequence in which tiles of the input tensors 106 are provided to the hardware accelerator 104 for processing. The example pooling mode/size/stride parameters can be used to define how pooling layers of a neural network in the convolution engine 118 are to be configured reduce or downsample output data to be represented by fewer cell values (e.g., smaller horizontal (X) and vertical (Y) dimensions). The example quantization and activation parameters are used to configure accumulators of the convolution engine 118 to output fewer bits per cell value based on a desired precision of cell values of an output tensor.

The example kernel parameters 134 include the layer parameters 132 and additional parameters that define weights data and structural characteristics of a convolution to be performed on the input tensor 106 and where to access tile data of the input tensor 106 in the system memory 114. For example, the kernel parameters 134 define dimensional characteristics of input tile data and output tile data of a convolution to be performed, and weight values to be convolved with the input tile data to generate the output tile data. The example kernel parameters 134 include an example tile dimension sizes parameter and example buffer pointer parameters. The example tile dimension sizes parameter defines the sizes of the horizontal (X), vertical (Y), and depth (Z) dimensions in terms of number of cells-per-dimension of the input tile data and the weight values to be used for performing convolutions on the input tile data. The example buffer pointer parameters define address pointers to memory (e.g., the system memory 114) at which the input data (e.g., the input tensor 106, input tiles and/or input micro-tiles) is stored for retrieval by the hardware accelerator 104, at which output data (e.g., output micro-tiles, output tiles and/or output tensors) is to be stored by the hardware accelerator 104, and at which weight values are stored for retrieval by the hardware accelerator 104 to perform convolutions.

The example hardware execution parameters 136 represent an interface (e.g., knobs) exposed by the hardware accelerator 104 to the acceleration manager 102 (e.g., firmware) so that the acceleration manager 102 can configure the hardware accelerator 104 to perform convolutions. In examples disclosed herein, sets of hardware execution parameters 136 are generated for respective layers of tiles. When a layer of a tile is provided to the hardware accelerator 104, the corresponding set of hardware execution parameters 136 for that layer is programmed into the parameters configuration registers 122 of the hardware accelerator 104 to configure how the convolution engine 118 is to perform a convolution on that layer. Example hardware execution parameters 136 include an example input depth (Z) size parameter, example output size parameters, example edges parameters, an example start row parameter, example buffer pointer parameters, an example bias set parameter, and an example eviction parameter.

The example input depth (Z) size parameter defines the size of the depth (Z) dimension of an input micro-tile. In examples disclosed herein, the depth (Z) size of the input micro-tile data is the only explicit input data dimension needed by the hardware accelerator 104 because the hardware accelerator 104 can derive the input sizes of the horizontal (X) dimension and the vertical (Y) dimension of the micro-tile based on the horizontal (X) dimension and the vertical (Y) dimension defined in the output dimensions parameters and/or based on padding mode. The example output size parameters define the horizontal (X) dimension, the vertical (Y) dimension, and the depth (Z) dimension of the output data (e.g., an output micro-tile) to be generated by the hardware accelerator 104. Output sizes are described in more detail below in connection with FIG. 6. The example edges parameters define whether edges (e.g., left edge, right edge, top edge, bottom edge) of an input micro-tile are internal edges (e.g., abutting with another tile), or external edges (e.g., an external boundary of the input tensor 106). Tile edges are described in more detail below in connection with FIG. 4. An example start row parameter defines the row of tiles of an input tensor that is being processed. For example, if the input tensor 106 has four rows of tiles (e.g., along the vertical (Y) dimension), and the current row of tiles being processed is the second row, the example start row parameters is set to two to specify the second row as the current row of the convolution operation. The example buffer pointer parameters specify address pointers to local memory (e.g., the local memory 110) at which input data of tiles is stored for retrieval by the hardware accelerator 104. The example buffer pointer parameters include multiple pointers that define the limits or boundaries of how the input data is stored in accordance with its structural horizontal (X) dimension, vertical (Y) dimension, and depth (Z) dimension for smaller-sized tiles of data referred to herein as micro-tiles that form a larger tile. Example micro-tiles are described below in connection with FIGS. 4 and 5. An example input pointer that can be represented in the buffer pointer parameters is described below in connection with FIG. 5. The example bias set parameter sets an initial bias value in an accumulator of the convolution engine 118 to which the convolution engine 118 will add as it performs a convolution while tile walking the multiple tiles of the input tensor 106. In some examples, when an accumulator is reset to begin a convolution at a next row and/or column, the accumulator is reset to the initial bias value. The example eviction parameter specifies when a last tile of a tile walk has been reached. For example, the eviction parameter is set to false when a current tile is not a last tile to be processed of the input tensor 106, and is set to true when a current tile is the last tile of the input tensor 106 to be processed.

Figure 3:
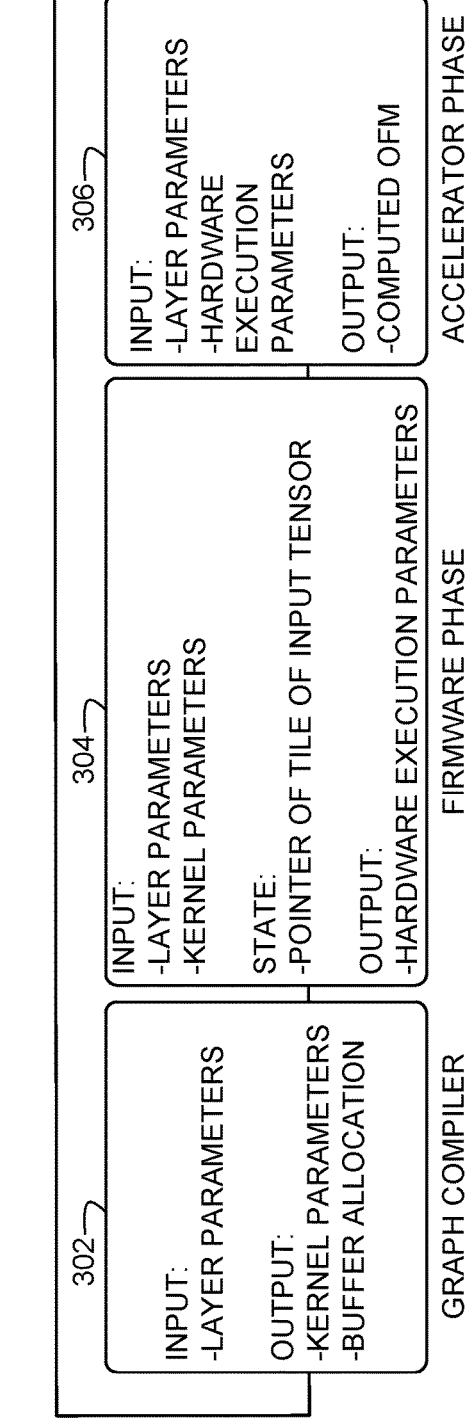
FIG. 3 is an example flow of phases for a compiler, firmware, and hardware accelerator to perform convolutions of input tensors based on hybrid firmware-hardware tile walking in accordance with examples disclosed herein.

FIG. 3 shows the generating and/or use of the example layer parameters 132, the example kernel parameters 134, and/or the hardware execution parameters 136 in association with an example flow of phases including an example graph compiler phase 302, an example firmware phase 304, and an example hardware accelerator phase 306. In the example graph compiler phase 302, the graph compiler 116 (FIG. 1) breaks down the larger surface of the input tensor 106 (FIG. 1) (e.g., the input tensor 106 is also referred to as a surface) into smaller tiles (e.g., tiles 402 of FIGS. 4 and 5) to store the input tensor 106 as tiles in the local memory 110 for access by the hardware accelerator 104 to perform per-tile convolution operations. For example, the graph compiler 116 can partition the input tensor 106 into smaller tiles by generating a table of buffer pointers demarcating tiles from one another of the overall input tensor 106 in the system memory 114. That is, the example graph compiler 116 defines the buffer points to point to different memory locations at which cell values of the tiles are stored in the system memory 114. In the illustrated example of the graph compiler phase 302, the graph compiler 116 receives the layer parameters 132 as user input and generates the kernel parameters 134 based on the layer parameters 132.

Figure 4:
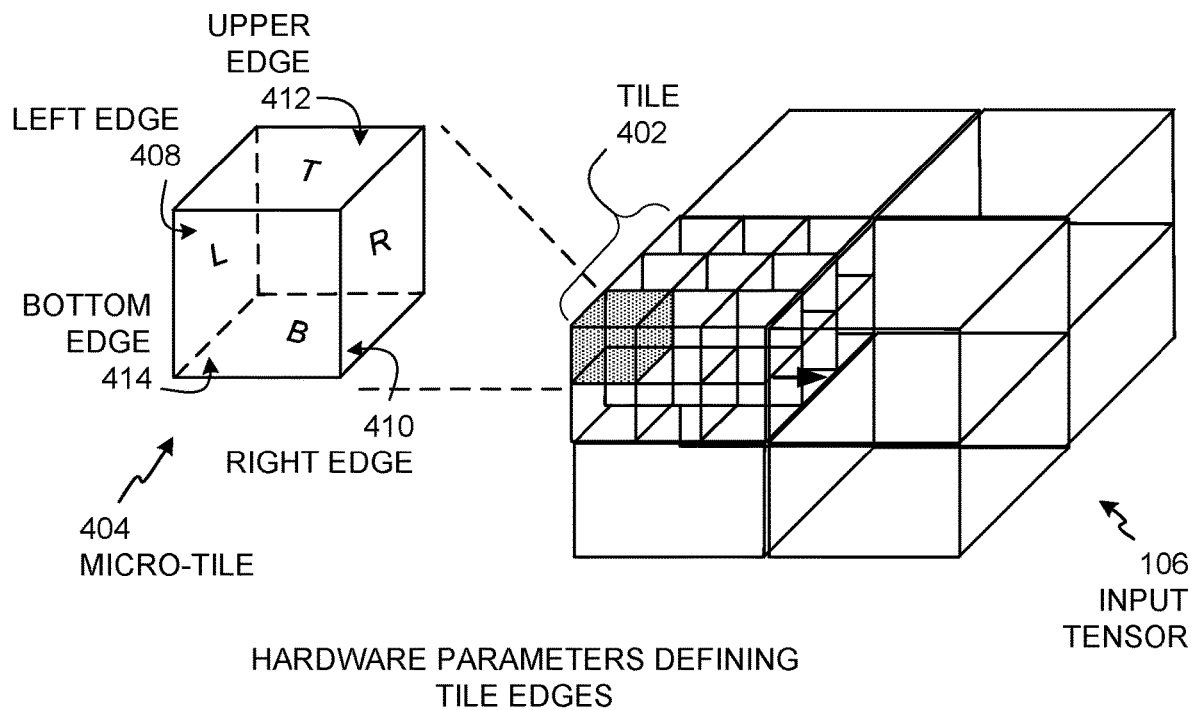
FIG. 4 shows how hardware execution parameters define tile edges in association with the example input tensor of FIGS. 1 and 2.
Figure 5:
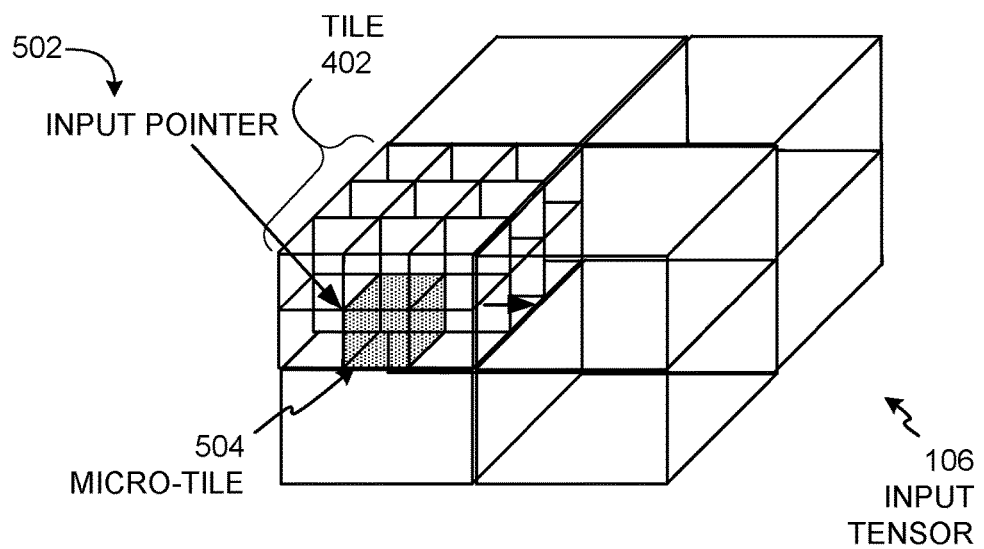
FIG. 5 shows how hardware execution parameters define an input pointer of a tile of the example input tensor of FIGS. 1, 2, and 4.

In the illustrated example of FIG. 3, the graph compiler 116 also generates example buffer allocation information based on the layer parameters 132 and/or the tiles (e.g., tiles 402 of FIGS. 4 and 5). The example tile partitions and the example buffer allocation information are represented in FIG. 1 as compiler decisions 142 stored in the system memory 114. The buffer allocation information specifies an amount of memory space that is to be allocated in the system memory 114 to store data of the input tensor 106 and/or an output tensor to be produced based on the convolution operations of the hybrid firmware-hardware tile walking. For example, the graph compiler 116 may generate the buffer allocation information based on the example input dimension sizes parameter, the example output dimension sizes parameter, the example data type parameter, the example padding mode parameter, and/or the example quantization and activation parameters. In the illustrated example, the host processor 112 (FIG. 1) may use the buffer allocation information of the compiler decisions 142 to make memory allocation requests to allocate memory space in the system memory 114 to store the input tensor 106. In the example graph compiler phase 302 of FIG. 3, the graph compiler 116 may also generate and store other types of compiler-produced information in the example compiler decisions 142 of FIG. 1.

In the example firmware phase 304 of FIG. 3, the acceleration manager 102 (FIG. 1) builds the convolution operation for the input tensor 106 based on tile walks to be performed by the hardware accelerator 104. For example, the acceleration manager 102 accesses the layer parameters 132 and the kernel parameters 134 in the system memory 114 (FIG. 1) and uses the layer parameters 132 and/or the kernel parameters 134 to generate state information and the hardware execution parameters 136 (FIG. 1) to configure the hardware accelerator 104 to perform the tile-based convolutions. In the illustrated example, the state information includes a pointer of a tile of the input tensor 106 (e.g., a tile of a surface). The pointer of the tile of the input tensor 106 specifies an address location of the local memory 110 (FIG. 1) at which data of the input tile has been stored by the DMA controller 126 (e.g., copied from the system memory 114 to the local memory 110). As such, the pointer of the tile is used by the acceleration manager 102 to identify where to access the data of the input tile in the local memory 110. In this manner, the acceleration manager 102 can manage or coordinate multiple tile-based convolutions of multiple input tiles and reconstruct an output tensor based on multiple output tiles produced by the convolution operations. In the example firmware phase 304, the acceleration manager 102 also generates iterators to iterate over the multiple tiles of the input tensor 106 in the horizontal (X) dimension, in the vertical (Y) dimension, and in the depth (Z) dimension. The multiple dimension iterators are used by the acceleration manager 102 to control the hardware accelerator 104 to implement a tile walk across all tiles of the input tensor 106 to perform multiple iterations of convolutions along the multiple dimensions of the input tensor 106.

In the example accelerator phase 306 of FIG. 3, the layer parameters 132 and the hardware execution parameters 136 are provided to the hardware accelerator 104 (FIG. 1). In some examples, the acceleration manager 102 generates one or more commands to provide the layer parameters 132 and the hardware execution parameters 136 to the hardware accelerator 104 and sends the one or more commands to the hardware accelerator 104 via the message bus 124 (FIG. 1). Additionally or alternatively, the hardware accelerator 104 accesses the layer parameters 132 and the hardware execution parameters 136 from the system memory 114 based on one or more commands received from the acceleration manager 102 via the message bus 124. In any case, the hardware accelerator 104 programs the layer parameters 132 and the hardware execution parameters 136 in the parameters configuration registers 122 (FIG. 1) to configure how the convolution engine 118 is to perform convolutions on input tile data to compute output data (e.g., OFM data of convolved tiles).

Although the example phases of FIG. 3 show the phases 302, 304, 306 as accessing and/or generating parameters as inputs and/or outputs, it should be understood that only some of the layer parameters 132 described above (and/or other layer parameters) may be used to generate the kernel parameters 134 and/or the compiler decisions 142 at the graph compiler phase 302. Similarly, only some of the layer parameters 132 and/or the kernel parameters 134 described above (and/or other layer parameters and/or kernel parameters) may be used to generate the hardware execution parameters 136 and/or the pointer of tile inside surface at the firmware phase 304. In addition, only some of the layer parameters 132 and/or the hardware execution parameters 136 described above (and/or other layer parameters and/or hardware execution parameters) may be provided to configure the hardware accelerator 104.

FIG. 4 shows how the example hardware execution parameters 136 (FIG. 1) define tile edges in association with the example input tensor 106. The example of FIG. 4 shows an example tile 402 that is a current tile to be processed. The example tile 402 is broken down into smaller micro-tiles by the acceleration manager 102. For example, the parameters generator 154 (FIG. 1) generates hardware execution parameters 136 (e.g., an example input depth (Z) size parameter, example output size parameters, example edges parameters, an example start row parameter, example buffer pointer parameters, etc.) that define smaller micro-tile structures to partition the input tensor 106 into smaller micro-tiles. As used herein, edges of a tile or micro-tile refers to the two-dimensional sides of the tile or micro-tile. An example micro-tile 404 is shown in magnified view to emphasize edges shown as an example left edge 408, an example right edge 410, an example upper edge 412, and an example bottom edge 414. In examples disclosed herein, the example left edge 408, the example right edge 410, the example upper edge 412, and the example bottom edge 414 are represented in the hardware execution parameters 136 as example edges parameters. In the illustrated example, the hardware accelerator 104 performs tile-based convolution on the tile 402 by iteratively convolving the smaller micro-tiles, such as the micro-tile 404, along the multiple dimensions of the input tensor 106. To perform such iterative convolutions, the example left edge 408, the example right edge 410, the example upper edge 412, and the example bottom edge 414 of each micro-tile are programmed into the parameters configuration registers 122 to configure the convolution engine 118 for each corresponding convolution operation of that micro-tile. Although a micro-tile has six edges (e.g., six sides), examples disclosed herein set up the per-tile convolution operations based on four edges of the micro-tile because the convolution operations performed are 2D convolutions along the horizontal (X) dimension and the vertical (Y) dimension.

In examples disclosed herein, the acceleration manager 102 configures the hardware accelerator 104 to know when it is processing an external micro-tile (e.g., a micro-tile that is at an external surface edge of the tile 402) so that the hardware accelerator 104 knows when to reset horizontal (X) and/or vertical (Y) accumulators that it uses for the convolution operations across the horizontal (X) and vertical (Y) dimensions. In the example of FIG. 4, the micro-tile 404 is a corner micro-tile which places two of its edges at external surfaces of the tile 402 and the input tensor 106. In particular, the left edge 408 is set equal to zero (e.g., left edge=0) because the left edge 408 is at an outer surface edge of the input tensor 106, the right edge 410 is set equal to a null value (e.g., right edge=no edge) because the right edge 410 is at an internal surface edge of the input tensor 106, the upper edge 412 is set equal to zero (e.g., upper edge=0) because the upper edge 412 is at an outer surface edge of the input tensor 106, and the bottom edge 414 is set equal a null value (e.g., bottom edge=no edge) because the bottom edge is at an internal surface edge of the input tensor 106. In some examples, internal surface edges are represented by a value of one (e.g., right edge=1, bottom edge=1) or any other value, instead of a null value.

FIG. 5 shows how the example hardware execution parameters 136 (FIG. 1) define an example input pointer 502 of a tile of the example input tensor 106. In the example of FIG. 5, the input pointer 502 points to an internal micro-tile 504 of the tile 402. The example input pointer 502 can be represented by a buffer pointer parameter of the hardware execution parameters 136 to specify an address in the local memory 110 (FIG. 1) at which input data of the micro-tile 504 is stored for retrieval by the hardware accelerator 104. To perform the tile walk across the tile 402, the acceleration manager 102 updates the input pointer 502 iteratively along the micro-tiles of the tile 402 in the horizontal (X), vertical (Y), and depth (Z) dimensions to configure the hardware accelerator 104 to access the input data of subsequent micro-tiles to be convolved. During a tile walk, the acceleration manager 102 also updates a weight pointer so that the hardware accelerator 104 knows the locations in the local memory 110 at which weight values are stored for performing the convolution for each micro-tile. In addition, the acceleration manager 102 also updates an output pointer so that the hardware accelerator 104 knows the locations in the local memory 110 at which to store output data resulting from the convolution operations of each micro-tile.

Figure 6:
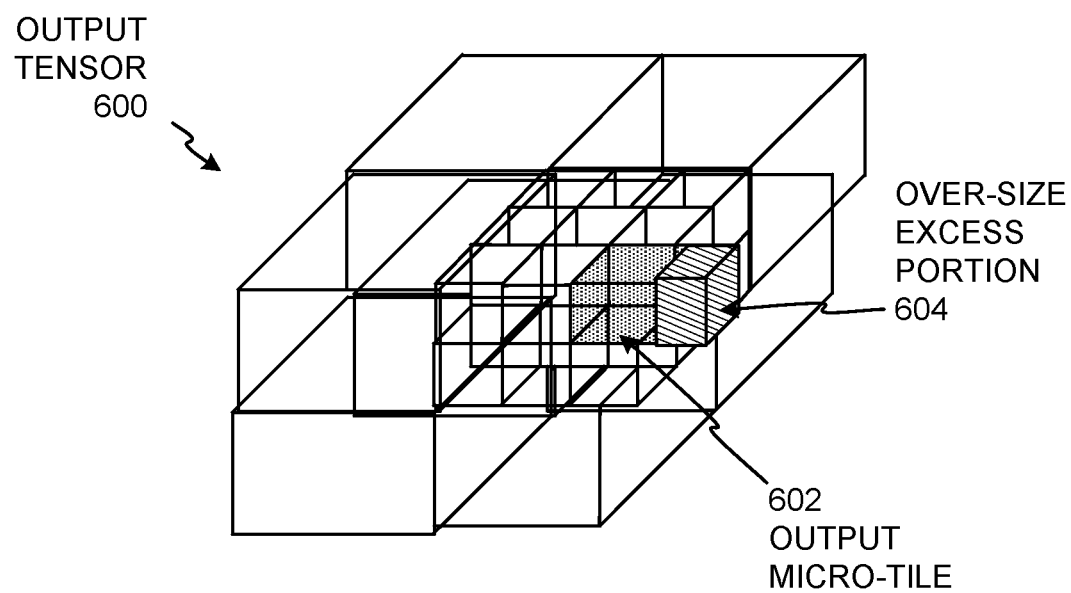
FIG. 6 shows an example output tensor having an output size defined by a hardware parameter.

FIG. 6 shows an example output tensor 600 having an output size of an output micro-tile 602 defined by an example output size parameter of the example hardware execution parameters 136 (FIG. 1). The example output size parameter defines the horizontal (X) dimension, the vertical (Y) dimension, and the depth (Z) dimension of the output micro-tile 602 to be generated by the hardware accelerator 104. That is, the acceleration manager 102 stores the output size parameter in the parameters configuration registers 122 to configure the hardware accelerator 104 on the size of the output micro-tile 602 that the convolution engine 118 is to compute. In examples disclosed herein, the output size parameter defines fixed sizes for the horizontal (X), the vertical (Y), and the depth (Z) dimensions that apply to all output micro-tiles to be generated for an input tensor. However, in some instances, one or more output micro-tiles at one or more edges of the output tensor 600 need to be smaller than the fixed-size defined by the output size parameter set in the parameters configuration registers 122. This can happen when an horizontal (X) dimension size, a vertical (Y) dimension size, and/or a depth (Z) dimension size is/are not evenly divisible by the fixed output size of output micro-tiles. In such examples, the acceleration manager 102 can update the output size parameter set in the parameters configuration registers 122 on a per-micro-tile basis. In the example of FIG. 6, such smaller output micro-tile computation is shown as an over-size excess portion 604 being excluded from the output micro-tile 602 computed by the convolution engine 118.

Returning to FIG. 1, to implement the convolution management in firmware (e.g., in the firmware phase 304 of FIG. 3), the example acceleration manager 102 includes an example memory interface 152, an example parameters generator 154, an example horizontal iterator controller 156, an example vertical iterator controller 158, an example depth iterator controller 160, an example command generator 162, and an example accelerator interface 164. The example memory interface 152 accesses the system memory 114 to retrieve and/or store ones of the example layer parameters 132, the example kernel parameters 134, the example hardware execution parameters 136, tensor data, and/or the example compiler decisions 142. The example parameters generator 154 generates the example hardware execution parameters 136 and/or pointers to addresses in the local memory 110 at which tiles are copied from the input surface 106 in the system memory 114. In some examples, the parameters generator 154 may also generate one or more of the example kernel parameters 134. The example horizontal iterator controller 156 generates horizontal (X) dimension iterator counters to iterate over tiles of the input tensor 106 in the horizontal (X) dimension. The horizontal (X) dimension iterator counters are used by the acceleration manager 102 to control the hardware accelerator 104 to tile walk across tiles of the input tensor 106 along the horizontal (X) dimension. The example vertical iterator controller 158 generates vertical (Y) dimension iterator counters to iterate over tiles of the input tensor 106 in the vertical (Y) dimension. The vertical (Y) dimension iterator counters are used by the acceleration manager 102 to control the hardware accelerator 104 to tile walk across tiles of the input tensor 106 along the vertical (Y) dimension. The example depth iterator controller 160 generates depth (Z) dimension iterator counters to iterate over tiles of the input tensor 106 in the depth (Z) dimension. The depth (Z) dimension iterator counters are used by the acceleration manager 102 to control the hardware accelerator 104 to tile walk across tiles of the input tensor 106 along the depth (Z) dimension. An example iteration order that can be implemented by the horizontal iterator controller 156, the vertical iterator controller 158, and the depth iterator controller 160 is described below in connection with FIG. 7.

The example command generator 162 generates commands to program ones of the layer parameters 132 and/or the hardware execution parameters 136 in the parameters configuration registers 122 to configure the hardware accelerator 104 to perform the convolutions of tiles in tile walk fashion. In some examples, the commands may include values of the layer parameters 132 and/or the hardware execution parameters 136 in one or more fields of message structures in which the commands are sent by the acceleration manager 102 to the hardware accelerator 104. In other examples, the commands instruct the hardware accelerator 104 to retrieve ones of the layer parameters 132 and/or the hardware execution parameters 136 from the system memory 114 for programming into the parameters configuration registers 122. The example accelerator interface 164 sends or transmits commands from the command generator 162 to the hardware accelerator 104 via the message bus 124.

While an example manner of implementing the acceleration manager 102, the hardware accelerator 104, and the graph compiler 116 is illustrated in FIG. 1, one or more of the elements, processes and/or devices illustrated in FIG. 1 may be combined, divided, re-arranged, omitted, eliminated and/or implemented in any other way. Further, the example graph compiler 116, the example memory interface 152, the example parameters generator 154, the example horizontal iterator controller 156, the example vertical iterator controller 158, the example depth iterator controller 160, the example command generator 162, the example accelerator interface 164, the example convolution engine 118 and/or, more generally, the example acceleration manager 102 and/or the hardware accelerator 104 of FIG. 1 may be implemented by hardware, software, firmware and/or any combination of hardware, software and/or firmware. Thus, for example, any of the example graph compiler 116, the example memory interface 152, the example parameters generator 154, the example horizontal iterator controller 156, the example vertical iterator controller 158, the example depth iterator controller 160, the example command generator 162, the example accelerator interface 164, the example convolution engine 118 and/or, more generally, the example acceleration manager 102 and/or the hardware accelerator 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example graph compiler 116, the example memory interface 152, the example parameters generator 154, the example horizontal iterator controller 156, the example vertical iterator controller 158, the example depth iterator controller 160, the example command generator 162, the example accelerator interface 164, and/or the example convolution engine 118 is/are hereby expressly defined to include a non-transitory computer readable storage device or storage disk such as a memory, a digital versatile disk (DVD), a compact disk (CD), a Blu-ray disk, etc. including the software and/or firmware. Further still, the example graph compiler 116, the example acceleration manager 102, and/or the example hardware accelerator 104 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, means for generating parameters may be implemented by the example parameters generator 154. In examples disclosed herein, means for controlling a horizontal iterator may be implemented by the example horizontal iterator controller 156. In examples disclosed herein, means for controlling a vertical iterator may be implemented by the example vertical iterator controller 158. In examples disclosed herein, means for controlling a depth iterator may be implemented by the example depth iterator controller 160. In examples disclosed herein, means for generating commands may be implemented by the example command generator 162. In examples disclosed herein, means for configuring a hardware accelerator (e.g., means for performing convolutions) may be implemented by the example accelerator interface 164. In examples disclosed herein means for generating a kernel parameter may be implemented by the example graph compiler 116. In examples disclosed herein, means for performing convolutions may be implemented by the hardware accelerator 104.

Figure 7:
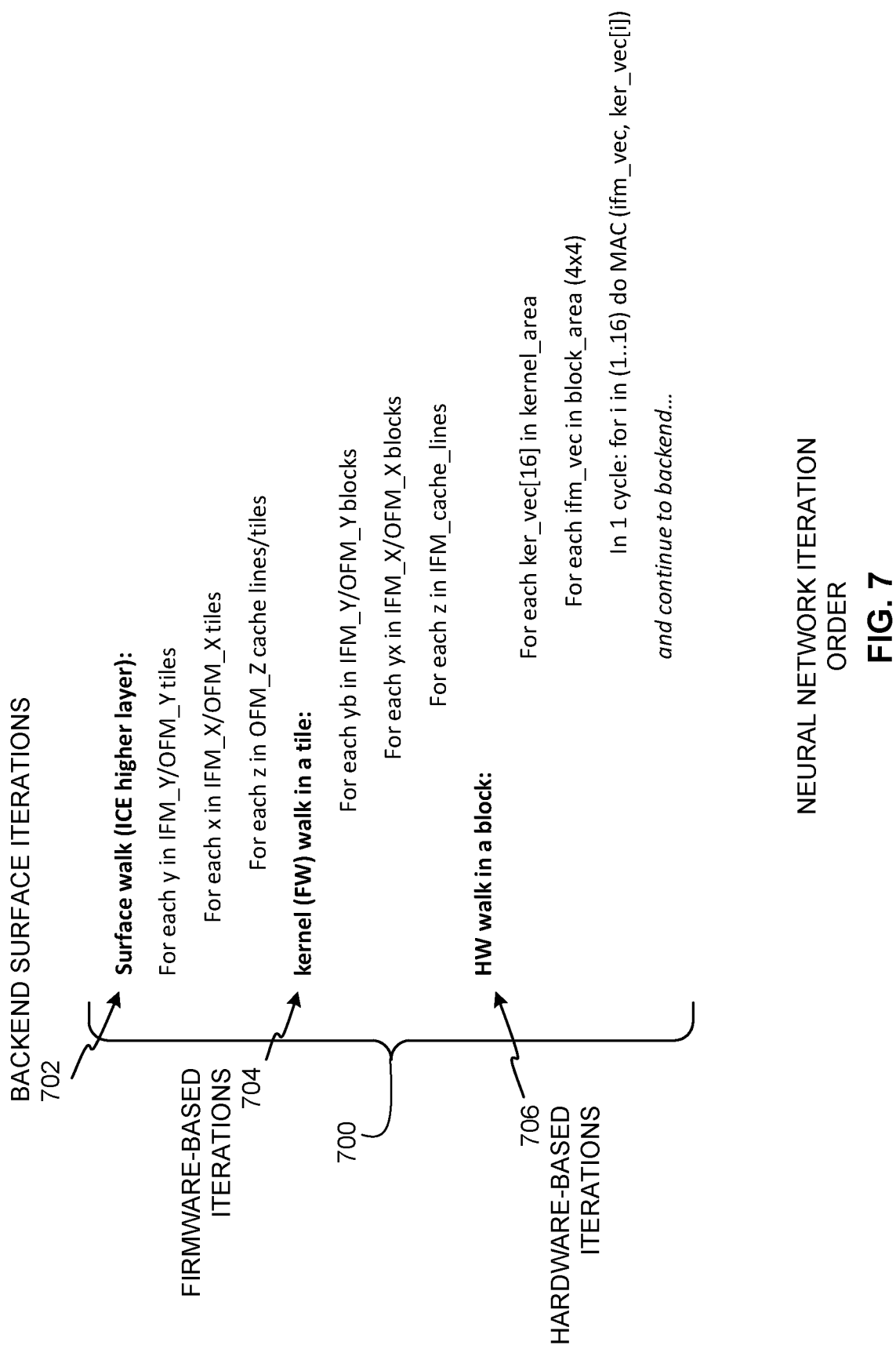
FIG. 7 is an example iteration order for a neural network to perform convolutions of input tensors based on hybrid firmware-hardware tile walking in accordance with examples disclosed herein.
Figure 9A:
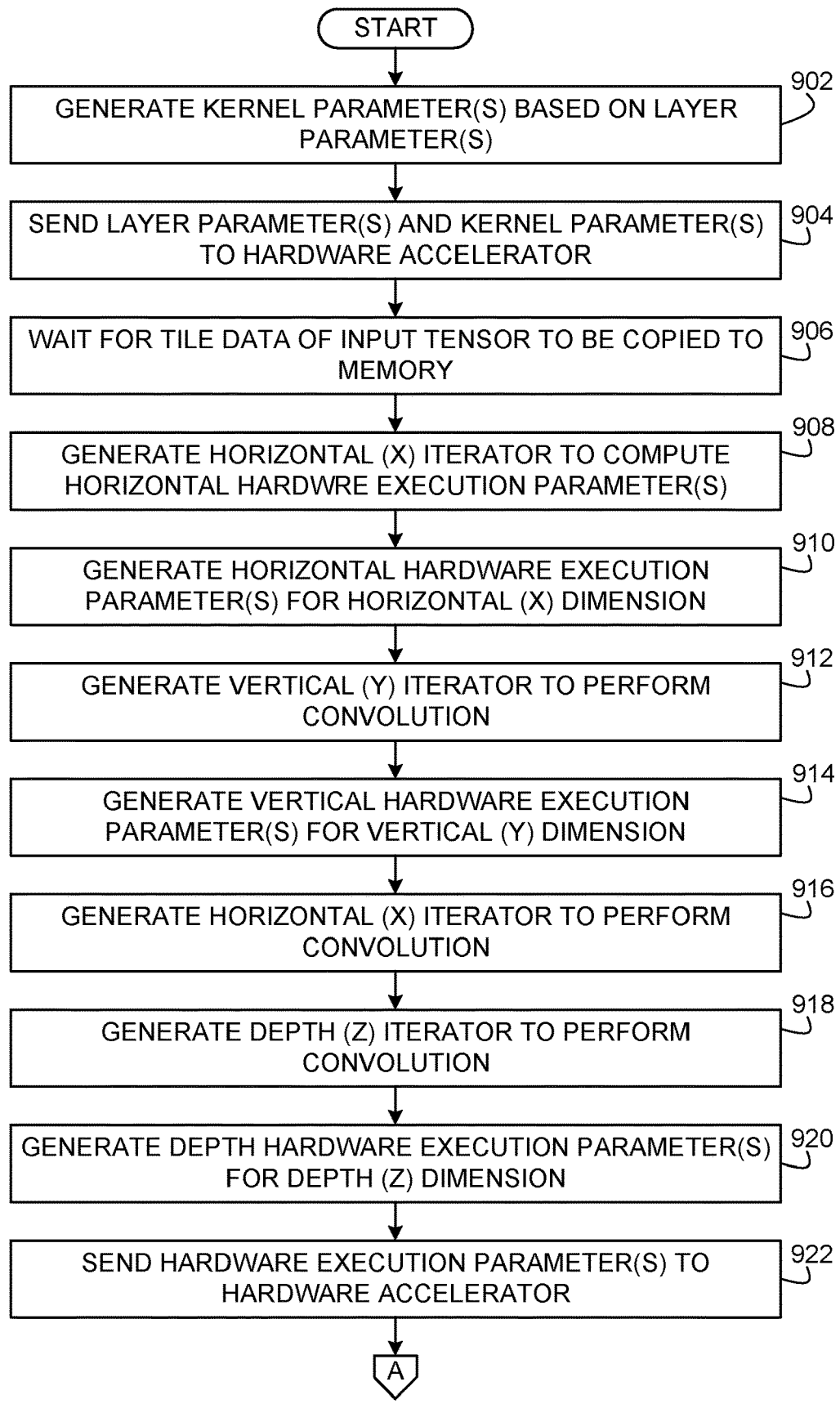
FIGS. 9A and 9B show an example flowchart representative of example machine readable instructions that may be executed to perform convolutions of input tensors based on hybrid firmware-hardware tile walking in accordance with examples disclosed herein.
Figure 9B:
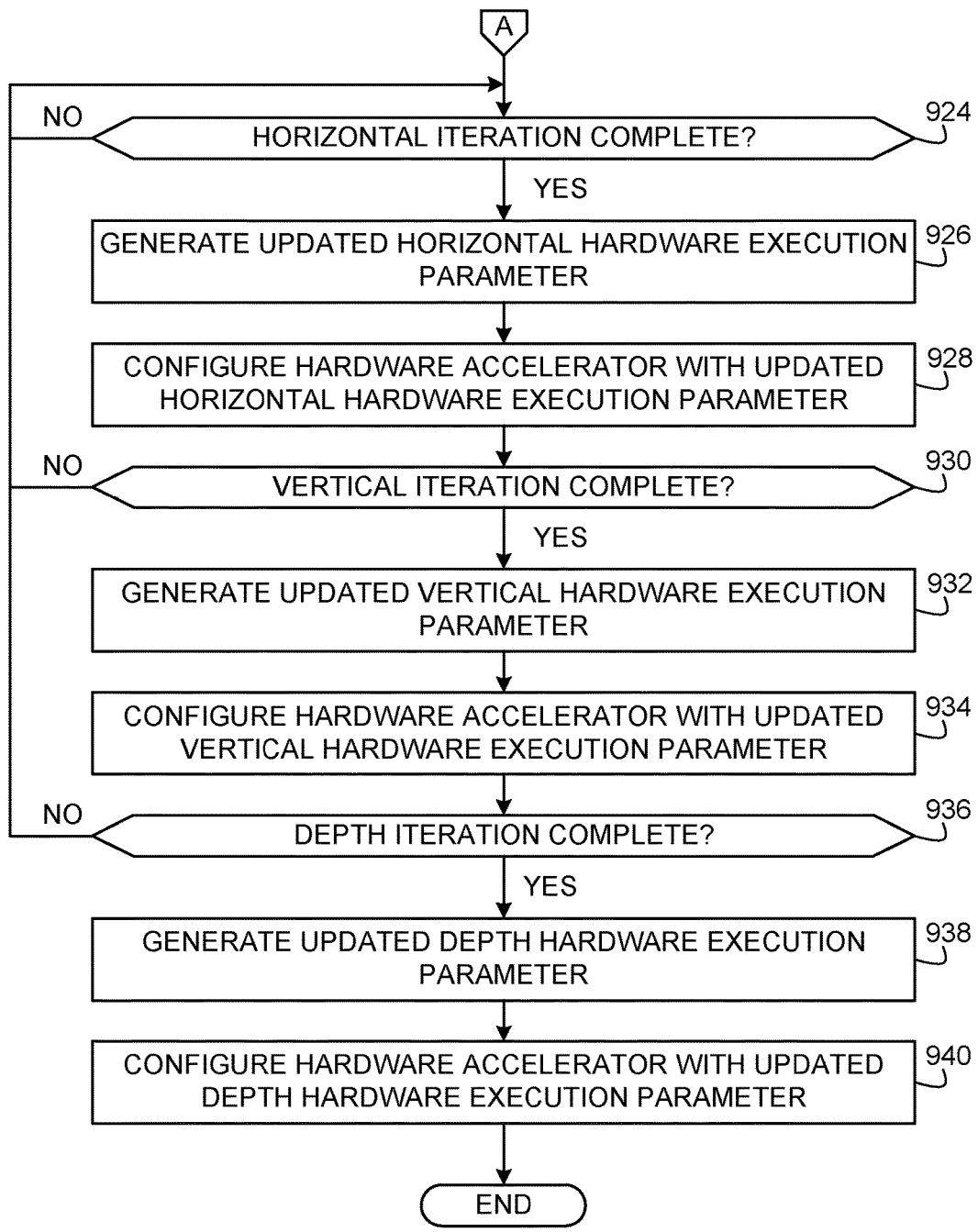

An example iteration order for a neural network of FIG. 7, example lines of code (LOCs) of FIGS. 8A-8H, and an example flowchart of FIGS. 9A and 9B are representative of example hardware logic, machine readable instructions, hardware implemented state machines, and/or any combination thereof for implementing the example graph compiler 116, the example acceleration manager 102, and/or the example hardware accelerator 104. The machine readable instructions may be one or more executable programs or portion(s) of an executable program for execution by a computer processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program(s) is/are described with reference to the flowchart illustrated in FIGS. 9A and 9B, the example iteration order for a neural network of FIG. 7, and/or the example lines of code (LOCs) of FIGS. 8A-8H, many other methods of implementing the example graph compiler 116, the example acceleration manager 102, and/or the example hardware accelerator 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9A and 9B, the iteration order for a neural network of FIG. 7, and/or the LOCs of FIGS. 8A-8H may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is an example iteration order 700 for a neural network (e.g., a CNN, a TNN, etc.) to perform convolutions of input tensors based on hybrid firmware-hardware tile walking. The example iteration order 700 is representative of machine readable instructions that may be executed by a processor to generate and manage horizontal (X) dimension iterators, vertical (Y) dimension iterators, and depth (Z) dimension iterators to perform hybrid firmware-hardware tile walking as disclosed herein. The example iteration order 700 includes an example backend surface iterations section 702, an example firmware-based iterations section 704, and an example hardware-based iterations section 706. The example backend surface iterations section 702 may be implemented by, for example, the graph compiler 116 executed by the host processor 112 (FIG. 1) to determine the example kernel parameters 134 (FIG. 1), to determine buffer allocation needs, and/or to control copying of tensor data between the system memory 114 and the local memory 110 (FIG. 1). For example, the backend surface iterations section 702 retrieves input tile data (e.g., IFM) and outputs/stores output tile data using a vertical (Y) dimension iteration, a horizontal (X) dimension iteration, and a depth (Z) dimension iteration. In some examples, moving of tensor data in the backend surface iterations section 702 may be performed using the DMA controller 126 (FIG. 1). In some examples, the host processor 112 also controls the DMA controller 126 to move tile data from the system memory 114 to the local memory 110 (FIG. 1) as part of the backend surface iterations section 702. For example, the graph compiler 116 (executed by the host processor 112) can generate a DMA program to control data copies/moves performed by the DMA controller 126. In this manner, the hardware accelerator 104 can copy tile data from the local memory 110 to its cache 128. For example, data of a tile (e.g., the tile 402 of FIGS. 4 and 5) and/or data of one or more micro-tiles (e.g., the micro-tiles 404 (FIG. 4) and/or 504 (FIG. 5)) may be stored per cache line of the cache 128.

The example firmware-based iterations section 704 may be implemented by, for example, the acceleration manager 102 (FIG. 1) to determine the hardware execution parameters 136 (FIG. 1), and to generate and manage iterators (e.g., vertical (Y) dimension iterators, horizontal (X) dimension iterators, and depth (Z) dimension iterators) to control convolution iterations for the tile walk to be for performed by the hardware accelerator 104 (FIG. 1). The example of FIG. 7, micro-tiles are referenced as blocks (e.g., multiple blocks per tile). The example hardware-based iterations section 706 may be implemented by, for example, the hardware accelerator 104 to perform convolutions for each micro-tile, or block, as instructed by the acceleration manager 102. For example, the hardware-based iterations section 706 refers to a tile as a kernel, and includes a kernel area loop (kernel_area) to convolve a 16×16 vector of weight values (ker_vec[16]) by 4×4 blocks (e.g., micro-tiles) of input tile data (ifm_vec in block area (4×4)). Also in the example hardware-based iterations section 706, the convolution operations are performed using a multiply-accumulate (MAC) operation represented as MAC(ifm_vec, ker_vec[i]).

FIGS. 8A-8H include example lines of code (LOCs) representing machine readable instructions that may be executed to implement the acceleration manager 102 of FIG. 1 to perform convolutions of input tensors based on hybrid firmware-hardware tile walking as disclosed herein. The example LOCs of FIGS. 8A-8H may be used to implement the example firmware-based iterations section 704 of FIG. 7 during the example firmware phase 304 of FIG. 3. The example LOCs of FIGS. 8A-8H are used to generate iterators and the hardware execution parameters 136, and calculate the hardware execution parameters 136 over multiple iterations tracked using the iterators. In this manner, the acceleration manager 102 can configure and control convolution operations of the hardware accelerator 104 to implement the tile walking of an input tensor 106 (FIGS. 1, 2, 4, 5). In the example LOCs of FIGS. 8A-8H, MIN and MINU notations are minimum and unsigned minimum operations, and MAX notation represents maximum operations.

FIG. 8A shows example LOCs 802 that are performed once per layer (e.g., once per input tensor 106) to determine a kernel state (e.g., structural characteristics of weights data to convolve with the input tensor 106), memory allocation needs in the system memory 114, the local memory 110, and/or in the cache 128 of FIG. 1. As part of the kernel state calculations, the example LOCs 802 determine height (X), width (Y), and depth (Z) dimension sizes of the input tensor 106 and the output tensor to be produced. The example LOCs 802 also accesses weight values to be used for the convolutions. FIG. 8B shows example LOCs 804 to setup the storing of weight values (w_block, w_lines) and input tile data (IFM) for storing in cache lines of the cache 128. The example LOCs 804 also setup an initial convolution center of a first TNN block on the input data (IFM surface). In examples disclosed herein, the LOCs 802 of FIG. 8A and the LOCs of FIG. 8B may be executed to implement the parameters generator 154 of FIG. 1 to generate the hardware execution parameters 136 based on the kernel parameters 134 and/or the layer parameters 132.

FIG. 8C shows example LOCs 806 to generate additional ones of the hardware execution parameters 136 based on the layer parameters 132 and the kernel parameters 134. The example LOCs 806 prepare the hardware execution parameters 136 for the horizontal (X) dimension, which leverage the symmetry along and input tile as a tile walking progresses from top to bottom. FIG. 8D shows example LOCs 808 that may be executed to generate an output data dimension size that is larger than input tile data by continuing a convolution along non-existent data (e.g., non-real delta-x) until an end of an output tile dimension size is reached to generate padding of data for the output data dimension size. FIG. 8E shows example LOCs 810 to control structuring and storing of output tile data (OFM) by looping over the output tile data based on the input tile data (IFM) and weight values (W) to be used in the convolutions.

FIG. 8F shows example LOCs 812 to iterate over the horizontal (X) dimension by sending hardware execution parameters 136 from the acceleration manager 102 to the hardware accelerator 104 for multiple micro-tiles of tiles of an input tensor. FIG. 8G shows example LOCs 814 to finish iterations for input data of a tile along the horizontal (X) dimension and to increment to a next starting point of the vertical (Y) dimension of that tile. FIG. 8H shows example LOCs 816 to manager convolution iterations operations over the vertical (Y) dimension of the tile.

FIGS. 9A and 9B depict an example flowchart representative of example machine readable instructions that may be executed to perform convolutions of input tensors (e.g., the input tensor 106 of FIGS. 1, 2, 4, and 5) based on hybrid firmware-hardware tile walking as disclosed herein. The example instructions represented in FIGS. 9A and 9B may be implemented in firmware and/or software executed by the host processor 112 to implement the graph compiler 116 of FIG. 1 and/or executed by the programmable controller 108 of FIG. 1 to implement the acceleration manager 102 of FIG. 1.

The program(s) of FIGS. 9A and 9B begin at block 902 of FIG. 9A at which the example graph compiler 116 generate one or more kernel parameter(s) 134 (FIG. 1) based on one or more layer parameter(s) 132 (FIG. 1) of the input tensor 106. For example, the graph compiler 116 may access the one or more layer parameter(s) 132 in the system memory 114 based on user input to generate the kernel parameter(s) 134. The example graph compiler 116 may also generate the kernel parameter(s) 134 based on the example compiler decisions 142 in the system memory 114. The example accelerator interface 164 (FIG. 1) sends the layer parameter(s) 132 and/or the kernel parameter(s) 134 to the example hardware accelerator 104 (block 904). The example memory interface 152 (FIG. 1) waits for tile data of the input tensor 106 to be copied to the local memory 110 (block 906). When the tile data of the input tensor 106 is available in the local memory 110, the horizontal iterator controller 156 (FIG. 1) generates a horizontal (X) iterator for use to compute one or more horizontal hardware execution parameter(s) for the tile data of the input tensor 106 (block 908). For example, a horizontal (X) iterator may be implemented as a counter or a programming loop (e.g., a for loop, a while loop, etc.) for use in analyzing the tile data of the input tensor 106 to generate the corresponding horizontal hardware execution parameter(s) for a first row of micro-tiles (e.g., a row including the micro-tile 404 of FIG. 4) to be convoluted along the horizontal (X) dimension.

The example parameters generator 154 (FIG. 1) generates one or more horizontal hardware execution parameter(s) for the first row of micro-tiles along the horizontal (X) dimension of the tile data of the input tensor 106 (block 910). For example, the horizontal hardware execution parameter(s) may be one or more of the hardware execution parameters 136 generated based on the kernel parameter(s) 134 and/or the layer parameter(s) 132. The horizontal hardware execution parameter(s) is/are to configure the hardware accelerator 104 to perform a horizontal iteration of the convolution. For example, a horizontal hardware execution parameter generated at block 910 may be a horizontal (X) dimension size of a micro-tile, edges parameters of a micro-tile, etc. The example vertical iterator controller 158 (FIG. 1) generates a vertical (Y) iterator for use in performing the convolution on the tile data of the input tensor 106 (block 912). For example, the vertical (Y) iterator may be implemented as a counter or a programming loop (e.g., a for loop, a while loop, etc.) that the vertical iterator controller 158 can use to track when vertical iterations of the convolution are completed. The example parameters generator 154 generates one or more vertical hardware execution parameter(s) for the vertical (Y) dimension (block 914). For example, the vertical hardware execution parameter(s) may be one or more of the hardware execution parameters 136 generated based on the kernel parameter(s) 134 and/or the layer parameter(s) 132. The vertical hardware execution parameter(s) is/are to configure the hardware accelerator 104 to perform a vertical iteration of the convolution. For example, a vertical hardware execution parameter generated at block 914 may be a vertical (Y) dimension size of a micro-tile, edges parameters of a micro-tile, a start row parameter, a bias set parameter, etc. The example horizontal iterator controller 156 generates a horizontal (X) iterator for use in performing the convolution on the tile data of the input tensor 106 (block 916). For example, the horizontal (X) iterator may be implemented as a counter or a programming loop (e.g., a for loop, a while loop, etc.) that the horizontal iterator controller 156 can use to track when horizontal iterations of the convolution are completed. The example vertical iterator controller 158 generates a depth (Z) iterator for use in performing the convolution on the tile data of the input tensor 106 (block 918). For example, the depth (Z) iterator may be implemented as a counter or a programming loop (e.g., a for loop, a while loop, etc.) that the vertical iterator controller 158 can use to track when depth iterations of the convolution are completed.

The example parameters generator 154 generates one or more depth hardware execution parameter(s) for the depth (Z) dimension (block 920). For example, the depth hardware execution parameter(s) may be one or more of the hardware execution parameters 136 generated based on the kernel parameter(s) 134 and/or the layer parameter(s) 132. The depth hardware execution parameter(s) is/are to configure the hardware accelerator 104 to perform a depth iteration of the convolution. For example, depth hardware execution parameter(s) generated at block 920 may be an input depth (Z) size of a micro-tile, edges parameters of a micro-tile, an eviction parameter, etc. The example accelerator interface 164 sends the one or more of the hardware execution parameter(s) 136 to the hardware accelerator 104 (block 922) to configure the hardware accelerator 104 based on the hardware execution parameter(s) 136. For example, the accelerator interface 164 can send the one or more command(s) in pipeline fashion to the hardware accelerator 104 via the message bus 124. The command generator 162 (FIG. 1) can generate the command(s) to include the one or more hardware execution parameter(s) 136 to provide specific/detailed operation definitions for executing convolution operations on tiles and/or micro-tiles (e.g., 2×2 micro-tiles, 4×4 micro-tiles, etc.). In this manner, the acceleration manager 102 informs the hardware accelerator 104 how to walk the tiles/micro-tiles of the input tensor 106 based on the one or more hardware execution parameter(s). The hardware accelerator 104 can execute the one or more command(s) from the message bus 124 one-by-one in a stateless fashion to program the one or more horizontal hardware execution parameter(s), the one or more vertical hardware execution parameter(s), and/or the one or more depth hardware execution parameter(s) in the parameters configuration registers 122.

Turning to FIG. 9B, as the convolution engine 118 of the hardware accelerator 104 performs convolutions based on the hardware execution parameter(s) 136 programmed into the parameters configuration registers 122, the acceleration manager 102 monitors for completions of horizontal iterations, vertical iterations, and depth iterations to advance the convolution operations of the convolution engine 118 along the horizontal (X) dimension, the vertical (Y) dimension, and the depth (Z) dimension until the convolution of the entire input tensor 106 is complete. At block 924 of FIG. 9B, the horizontal iterator controller 156 determines when the hardware accelerator 104 completes a horizontal iteration of the convolution. For example, the horizontal iterator controller 156 may increment the horizontal (X) iterator (e.g., the horizontal (X) iterator generated at block 916) for each micro-tile provided to the hardware accelerator 104 and monitor for completion of a horizontal iteration based on the horizontal (X) iterator (e.g., all micro-tiles in a horizontal row have been convolved). When the hardware accelerator 104 completes a horizontal iteration of the convolution, the example parameters generator 154 generates one or more updated horizontal hardware execution parameter(s) (block 926). The example accelerator interface 164 sends the one or more updated horizontal hardware execution parameter(s) to the hardware accelerator 104 (block 928) to configure the hardware accelerator 104 to perform another horizontal iteration of the convolution based on the one or more updated horizontal hardware execution parameter(s).

The vertical Iterator controller 158 determines when the hardware accelerator 104 completes a vertical iteration of the convolution (block 930). For example, the vertical Iterator controller 158 may increment the vertical (Y) iterator (e.g., the vertical (Y) iterator generated at block 912) for each horizontal row of micro-tiles processed by the hardware accelerator 104 and monitor for completion of a vertical iteration based on the vertical (Y) iterator (e.g., all rows of micro-tiles in a horizontal-vertical layer have been convolved). When the hardware accelerator 104 completes a vertical iteration of the convolution, the example parameters generator 154 generates one or more updated vertical hardware execution parameter(s) (block 932). The example accelerator interface 164 sends the one or more updated vertical hardware execution parameter(s) to the hardware accelerator 104 (block 932) to configure the hardware accelerator 104 to perform another vertical iteration of the convolution based on the one or more updated vertical hardware execution parameter(s).

The depth iterator controller 160 determines when the hardware accelerator 104 completes a depth iteration of the convolution (block 936). For example, the vertical iterator controller 158 may increment the depth (Z) iterator (e.g., the depth (Z) iterator generated at block 918) for each layer processed by the hardware accelerator 104 and monitor for completion of a depth iteration based on the depth (Z) iterator (e.g., all layers of micro-tiles in a tile have been convolved). When the hardware accelerator 104 completes a depth iteration of the convolution, the example parameters generator 154 generates one or more updated depth hardware execution parameter(s) (block 938). The example accelerator interface 164 sends the one or more updated depth hardware execution parameter(s) to the hardware accelerator 104 (block 940) to configure the hardware accelerator 104 to perform another depth iteration of the convolution based on the one or more updated depth hardware execution parameter(s).

The acceleration manager 102 can manage special cases by updating the one or more hardware execution parameter(s) 136 at blocks 926, 932, and 938 according to those special cases. For example, when an end of output depth is reached for an output tensor and additional input tensor data and/or weight values is/are to be convolved, the parameters generator 154 may update corresponding ones of the hardware execution parameter(s) 136 to truncate additional convolved data to maintain the small size defined for the output tensor. Additionally or alternatively, when an end of input width is reached for the input tensor 106 and the specified size for an output tensor has not been reached, the parameters generator 154 may update corresponding ones of the hardware execution parameter(s) 136 to pad the additional cell values of the output tensor with padding data to satisfy the defined size of the output tensor. The example program(s) of FIGS. 9A and 9B then end(s).

Figure 10:
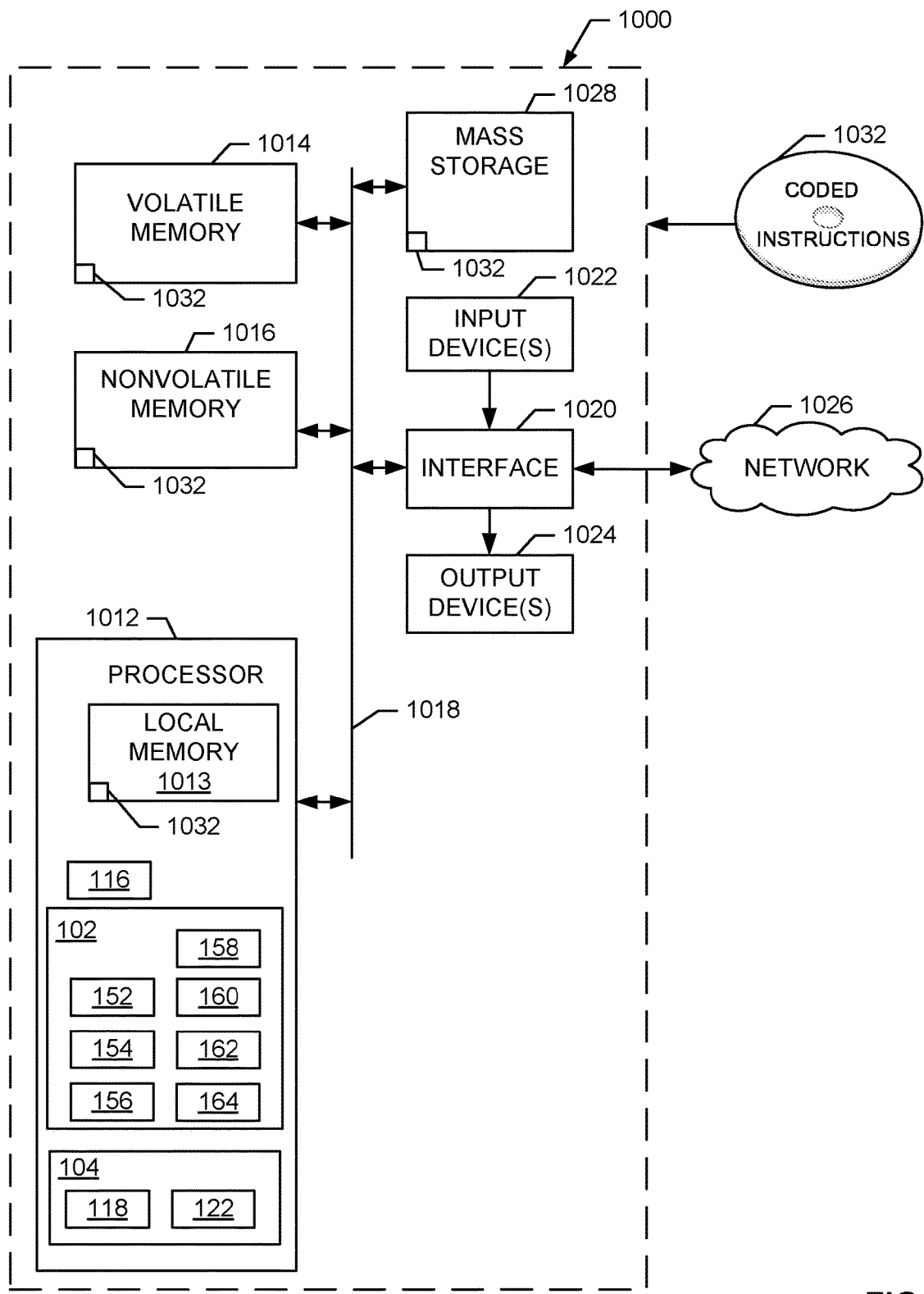
FIG. 10 is a block diagram of an example processor platform structured to execute the instructions represented in FIG. 7, FIGS. 8A-8H, and/or FIGS. 9A and 9B to implement the example graph compiler, acceleration manager, and/or hardware accelerator of FIG. 1 to perform convolutions of input tensors based on hybrid firmware-hardware tile walking in accordance with examples disclosed herein.

FIG. 10 is a block diagram of an example processor platform 1000 structured to execute the instructions represented in FIG. 7, FIGS. 8A-8H, and/or FIGS. 9A and 9B to implement the example graph compiler 116, the example acceleration manager 102, and/or the example hardware accelerator 104 of FIG. 1 to perform convolutions of input tensors based on hybrid firmware-hardware tile walking in accordance with examples disclosed herein. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example graph compiler 116, the example acceleration manager 102, the example memory interface 152, the example parameters generator 154, the example horizontal iterator controller 156, the example vertical iterator controller 158, the example depth iterator controller 160, the example command generator 162, and the example accelerator interface 164. In some examples, the processor 1012 also implements the hardware accelerator 104, including the convolution engine 118 and the parameters configuration registers 122. In other examples, the hardware accelerator 104 is implemented in separate dedicated hardware logic circuitry (e.g., an ASIC).

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

Machine executable instructions 1032 represented in FIGS. 7, 8A-8H, 9A, and/or 9B may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that perform hybrid firmware-hardware tile walking to perform convolution operations on tensors using hardware acceleration managed by firmware. Disclosed methods, apparatus and articles of manufacture improve the efficiency of using a computing device by using software and/or firmware to break up an input tensor into multiple smaller tiles and/or micro-tiles, using firmware to generate hardware execution parameters to control convolution operations of the input data, and configuring a hardware accelerator (e.g., accelerator circuitry) based on the hardware execution parameters to perform the processing intensive convolution operations on the input data corresponding to the smaller tiles and/or micro-tiles. By using the hardware accelerator, the software/firmware processes can offload the processing intensive recursive convolution operations from a host processor and/or a controller to a hardware accelerator that can be configured to perform each convolution iteration in accordance with configurations provided by the software/firmware. This frees up resources of the host processor and/or the programmable controller (e.g., a DSP, an ASIP, etc.) executing the software/firmware to perform other processes while the hardware accelerator performs the numerically intensive convolution operations. In addition, the hardware accelerator can complete convolution operations faster than a host processor and/or programmable controller executing software/firmware. Also, the host processor and/or programmable controller executing the software/firmware can offload a significant amount of memory accesses to access input tensor data and to store output tensor data by configuring the hardware accelerator to perform such memory accesses directly (e.g., via a DMA controller) as part of the convolution operations. Other advantages of prior techniques are also readily apparent from the examples disclosed herein. Disclosed methods, apparatus and articles of manufacture are accordingly directed to one or more improvement(s) in the functioning of a computer.

Example methods, apparatus, systems, and articles of manufacture to tile walk a tensor for convolution operations are disclosed herein. Further examples and combinations thereof include the following:

Example 1 includes an apparatus to perform a convolution on an input tensor, the apparatus comprising a parameters generator to generate a horizontal hardware execution parameter for a horizontal dimension of the input tensor based on at least one of a kernel parameter or a layer parameter, and generate a vertical hardware execution parameter for a vertical dimension of the input tensor based on at least one of the kernel parameter or the layer parameter, an accelerator interface to configure hardware accelerator circuitry based on the horizontal and vertical hardware execution parameters, a horizontal iterator controller to determine when the hardware accelerator circuitry completes a first horizontal iteration of the convolution, and a vertical iterator controller to determine when the hardware accelerator circuitry completes a first vertical iteration of the convolution.

Example 2 includes the apparatus of example 1, wherein the layer parameter includes an input dimension sizes parameter of the input tensor, the kernel parameter includes a tile dimension sizes parameter of a tile of the input tensor, and the hardware execution parameter includes an input depth size parameter of a micro-tile of the tile.

Example 3 includes the apparatus of any one or more of Examples 1-2, wherein the horizontal hardware execution parameter is to configure the hardware accelerator circuitry to perform the first horizontal iteration of the convolution, and the vertical hardware execution parameter is to configure the hardware accelerator circuitry to perform the first vertical iteration of the convolution.

Example 4 includes the apparatus of any one or more of Examples 1-3, wherein the parameters generator is to generate a depth hardware execution parameter for a depth dimension of a micro-tile of the input tensor based on at least one of the kernel parameter or the layer parameter, and the accelerator interface is to configure the hardware accelerator circuitry to perform the convolution based on the depth hardware execution parameter.

Example 5 includes the apparatus of any one or more of Examples 1-4, further including a depth iterator controller to determine when the hardware accelerator circuitry completes a first depth iteration of the convolution, the parameters generator to generate an updated depth hardware execution parameter when the hardware accelerator circuitry completes the first depth iteration of the convolution, the updated depth hardware execution parameter to configure the hardware accelerator circuitry to perform a second depth iteration of the convolution.

Example 6 includes the apparatus of any one or more of Examples 1-5, wherein the parameters generator is further to generate an updated horizontal hardware execution parameter when the hardware accelerator circuitry completes a horizontal iteration, and generate an updated vertical hardware execution parameter when the hardware accelerator circuitry completes a vertical iteration of the convolution, and the accelerator interface is further to configure the updated horizontal hardware execution parameter in the hardware accelerator circuitry to perform a second horizontal iteration of the convolution, and configure the updated vertical hardware execution parameter in the hardware accelerator circuitry to perform a second vertical iteration of the convolution.

Example 7 includes the apparatus of any one or more of Examples 1-6, further including a graph compiler to generate the kernel parameter based on the layer parameter of the input tensor.

Example 8 includes the apparatus of any one or more of Examples 1-7, further including the hardware accelerator circuitry, and a programmable controller in communication with the hardware accelerator, the programmable controller including the parameters generator, the accelerator interface, the horizontal iterator controller, and the vertical iterator controller.

Example 9 includes a non-transitory computer readable storage medium comprising instructions that, when executed by a controller, cause the controller to at least generate a horizontal hardware execution parameter for a horizontal dimension of an input tensor based on at least one of a kernel parameter or a layer parameter, generate a vertical hardware execution parameter for a vertical dimension of the input tensor based on at least one of the kernel parameter or the layer parameter, configure hardware accelerator circuitry based on the horizontal and vertical hardware execution parameters, determine when the hardware accelerator circuitry completes a first horizontal iteration of a convolution, and determine when the hardware accelerator circuitry completes a first vertical iteration of the convolution.

Example 10 includes the non-transitory computer readable storage medium as defined in example 9, wherein the layer parameter includes an input dimension sizes parameter of the input tensor, the kernel parameter includes a tile dimension sizes parameter of a tile of the input tensor, and the hardware execution parameter includes an input depth size parameter of a micro-tile of the tile.

Example 11 includes the non-transitory computer readable storage medium as defined in any one or more of Examples 9-10, wherein the horizontal hardware execution parameter is to configure the hardware accelerator circuitry to perform the first horizontal iteration of the convolution, and the vertical hardware execution parameter is to configure the hardware accelerator circuitry to perform the first vertical iteration of the convolution.

Example 12 includes the non-transitory computer readable storage medium as defined in any one or more of Examples 9-11, wherein the instructions are further to cause the controller to generate a depth hardware execution parameter for a depth dimension of a micro-tile of the input tensor based on at least one of the kernel parameter or the layer parameter, and configure the hardware accelerator circuitry to perform the convolution based on the depth hardware execution parameter.

Example 13 includes the non-transitory computer readable storage medium as defined in any one or more of Examples 9-12, wherein the instructions are further to cause the controller to determine when the hardware accelerator circuitry completes a first depth iteration of the convolution, and generate an updated depth hardware execution parameter when the hardware accelerator circuitry completes the first depth iteration of the convolution, the updated depth hardware execution parameter to configure the hardware accelerator circuitry to perform a second depth iteration of the convolution.

Example 14 includes the non-transitory computer readable storage medium as defined in any one or more of Examples 9-13, wherein the instructions are further to cause the controller to generate an updated horizontal hardware execution parameter when the hardware accelerator circuitry completes a horizontal iteration, generate an updated vertical hardware execution parameter when the hardware accelerator circuitry completes a vertical iteration of the convolution, configure the updated horizontal hardware execution parameter in the hardware accelerator circuitry to perform a second horizontal iteration of the convolution, and configure the updated vertical hardware execution parameter in the hardware accelerator circuitry to perform a second vertical iteration of the convolution.

Example 15 includes the non-transitory computer readable storage medium as defined in any one or more of Examples 9-14, wherein the instructions are further to cause the controller to generate the kernel parameter based on the layer parameter of the input tensor.

Example 16 includes a method to perform a convolution on an input tensor, the method comprising generating a horizontal hardware execution parameter for a horizontal dimension of the input tensor based on at least one of a kernel parameter or a layer parameter, generating a vertical hardware execution parameter for a vertical dimension of the input tensor based on at least one of the kernel parameter or the layer parameter, configuring hardware accelerator circuitry based on the horizontal and vertical hardware execution parameters, determining when the hardware accelerator circuitry completes a first horizontal iteration of the convolution, and determining when the hardware accelerator circuitry completes a first vertical iteration of the convolution.

Example 17 includes the method as defined in Example 16, wherein the layer parameter includes an input dimension sizes parameter of the input tensor, the kernel parameter includes a tile dimension sizes parameter of a tile of the input tensor, and the hardware execution parameter includes an input depth size parameter of a micro-tile of the tile.

Example 18 includes the method as defined in any one or more of Examples 16-17, wherein the horizontal hardware execution parameter is to configure the hardware accelerator circuitry to perform the first horizontal iteration of the convolution, and the vertical hardware execution parameter is to configure the hardware accelerator circuitry to perform the first vertical iteration of the convolution.

Example 19 includes the method as defined in any one or more of Examples 16-18, further including generating a depth hardware execution parameter for a depth dimension of a micro-tile of the input tensor based on at least one of the kernel parameter or the layer parameter, and configuring the hardware accelerator circuitry to perform the convolution based on the depth hardware execution parameter.

Example 20 includes the method as defined in any one or more of Examples 16-19, further including determining when the hardware accelerator circuitry completes a first depth iteration of the convolution, and generating an updated depth hardware execution parameter when the hardware accelerator circuitry completes the first depth iteration of the convolution, the updated depth hardware execution parameter to configure the hardware accelerator circuitry to perform a second depth iteration of the convolution.

Example 21 includes the method as defined in any one or more of Examples 16-20, further including generating an updated horizontal hardware execution parameter when the hardware accelerator circuitry completes a horizontal iteration, generating an updated vertical hardware execution parameter when the hardware accelerator circuitry completes a vertical iteration of the convolution, configuring the updated horizontal hardware execution parameter in the hardware accelerator circuitry to perform a second horizontal iteration of the convolution, and configuring the updated vertical hardware execution parameter in the hardware accelerator circuitry to perform a second vertical iteration of the convolution.

Example 22 includes the method as defined in any one or more of Examples 16-21, further including generating the kernel parameter based on the layer parameter of the input tensor.

Example 23 includes an apparatus to perform a convolution on an input tensor, the apparatus comprising means for generating parameters to generate a horizontal hardware execution parameter for a horizontal dimension of the input tensor based on at least one of a kernel parameter or a layer parameter, and generate a vertical hardware execution parameter for a vertical dimension of the input tensor based on at least one of the kernel parameter or the layer parameter, means for configuring means for performing convolutions based on the horizontal and vertical hardware execution parameters, means for controlling a horizontal iterator to determine when the means for performing convolutions completes a first horizontal iteration of the convolution, and means for controlling a vertical iterator to determine when the means for performing convolutions completes a first vertical iteration of the convolution.

Example 24 includes the apparatus of Example 23, wherein the layer parameter includes an input dimension sizes parameter of the input tensor, the kernel parameter includes a tile dimension sizes parameter of a tile of the input tensor, and the hardware execution parameter includes an input depth size parameter of a micro-tile of the tile.

Example 25 includes the apparatus of any one or more of Examples 23-24, wherein the horizontal hardware execution parameter is to configure the means for performing convolutions to perform the first horizontal iteration of the convolution, and the vertical hardware execution parameter is to configure the means for performing convolutions to perform the first vertical iteration of the convolution.

Example 26 includes the apparatus of any one or more of Examples 23-25, wherein the means for generating parameters is to generate a depth hardware execution parameter for a depth dimension of a micro-tile of the input tensor based on at least one of the kernel parameter or the layer parameter, and the means for configuring the means for performing convolutions is to configure the means for performing convolutions to perform the convolution based on the depth hardware execution parameter.

Example 27 includes the apparatus of any one or more of Examples 23-26, further including means for controlling a depth iterator to determine when the means for performing convolutions completes a first depth iteration of the convolution, the means for generating parameters to generate an updated depth hardware execution parameter when the means for performing convolutions completes the first depth iteration of the convolution, the updated depth hardware execution parameter to configure the means for performing convolutions to perform a second depth iteration of the convolution.

Example 28 includes the apparatus of any one or more of Examples 23-27, wherein the means for generating parameters is further to generate an updated horizontal hardware execution parameter when the means for performing convolutions completes a horizontal iteration, and generate an updated vertical hardware execution parameter when the means for performing convolutions completes a vertical iteration of the convolution, and means for configuring the means for performing convolutions is to configure the updated horizontal hardware execution parameter in the means for performing convolutions to perform a second horizontal iteration of the convolution, and configure the updated vertical hardware execution parameter in the means for performing convolutions to perform a second vertical iteration of the convolution.

Example 29 includes the apparatus of any one or more of Examples 23-28, further including means for generating the kernel parameter based on the layer parameter of the input tensor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform a convolution on an input tensor, the apparatus comprising:
    a parameters generator to:
        generate a horizontal hardware execution parameter for a horizontal dimension of the input tensor based on at least one of a kernel parameter or a layer parameter; and
        generate a vertical hardware execution parameter for a vertical dimension of the input tensor based on at least one of the kernel parameter or the layer parameter;
    an accelerator interface to configure hardware accelerator circuitry based on the horizontal and vertical hardware execution parameters;
    a horizontal iterator controller to determine when the hardware accelerator circuitry completes a first horizontal iteration of the convolution; and
    a vertical iterator controller to determine when the hardware accelerator circuitry completes a first vertical iteration of the convolution, at least one of the parameters generator, the accelerator interface, the horizontal iterator controller, or the vertical iterator controller to include circuitry.

2. The apparatus of claim 1, wherein the layer parameter includes an input dimension sizes parameter of the input tensor, the kernel parameter includes a tile dimension sizes parameter of a tile of the input tensor, the accelerator interface to configure the hardware accelerator circuitry based on an input depth size parameter of a micro-tile of the tile.

3. The apparatus of claim 1, wherein the horizontal hardware execution parameter is to configure the hardware accelerator circuitry to perform the first horizontal iteration of the convolution, and the vertical hardware execution parameter is to configure the hardware accelerator circuitry to perform the first vertical iteration of the convolution.

4. The apparatus of claim 1, wherein:
    the parameters generator is to generate a depth hardware execution parameter for a depth dimension of a micro-tile of the input tensor based on at least one of the kernel parameter or the layer parameter; and
    the accelerator interface is to configure the hardware accelerator circuitry to perform the convolution based on the depth hardware execution parameter.

5. The apparatus of claim 4, further including a depth iterator controller to determine when the hardware accelerator circuitry completes a first depth iteration of the convolution, the parameters generator to generate an updated depth hardware execution parameter when the hardware accelerator circuitry completes the first depth iteration of the convolution, the updated depth hardware execution parameter to configure the hardware accelerator circuitry to perform a second depth iteration of the convolution.

6. The apparatus of claim 1, wherein:
    the parameters generator is further to:
        generate an updated horizontal hardware execution parameter when the hardware accelerator circuitry completes a horizontal iteration; and
        generate an updated vertical hardware execution parameter when the hardware accelerator circuitry completes a vertical iteration of the convolution; and
    the accelerator interface is further to:
        configure the updated horizontal hardware execution parameter in the hardware accelerator circuitry to perform a second horizontal iteration of the convolution; and
        configure the updated vertical hardware execution parameter in the hardware accelerator circuitry to perform a second vertical iteration of the convolution.

7. The apparatus of claim 1, further including a graph compiler to generate the kernel parameter based on the layer parameter of the input tensor.

8. The apparatus of claim 1, further including:
    the hardware accelerator circuitry; and
    a programmable controller in communication with the hardware accelerator circuitry, the programmable controller including the parameters generator, the accelerator interface, the horizontal iterator controller, and the vertical iterator controller.

9. A non-transitory computer readable storage medium comprising instructions that, when executed by a controller, cause the controller to at least:
    generate a horizontal hardware execution parameter for a horizontal dimension of an input tensor based on at least one of a kernel parameter or a layer parameter;
    generate a vertical hardware execution parameter for a vertical dimension of the input tensor based on at least one of the kernel parameter or the layer parameter;
    configure hardware accelerator circuitry based on the horizontal and vertical hardware execution parameters;
    determine when the hardware accelerator circuitry completes a first horizontal iteration of a convolution; and determine when the hardware accelerator circuitry completes a first vertical iteration of the convolution.

10. The non-transitory computer readable storage medium as defined in claim 9, wherein the layer parameter includes an input dimension sizes parameter of the input tensor, the kernel parameter includes a tile dimension sizes parameter of a tile of the input tensor, the instructions to cause the controller to configure the hardware accelerator circuitry based on an input depth size parameter of a micro-tile of the tile.

11. The non-transitory computer readable storage medium as defined in claim 9, wherein the horizontal hardware execution parameter is to configure the hardware accelerator circuitry to perform the first horizontal iteration of the convolution, and the vertical hardware execution parameter is to configure the hardware accelerator circuitry to perform the first vertical iteration of the convolution.

12. The non-transitory computer readable storage medium as defined in claim 9, wherein the instructions are further to cause the controller to:
generate a depth hardware execution parameter for a depth dimension of a micro-tile of the input tensor based on at least one of the kernel parameter or the layer parameter; and
configure the hardware accelerator circuitry to perform the convolution based on the depth hardware execution parameter.

13. The non-transitory computer readable storage medium as defined in claim 12, wherein the instructions are further to cause the controller to:
determine when the hardware accelerator circuitry completes a first depth iteration of the convolution; and
generate an updated depth hardware execution parameter when the hardware accelerator circuitry completes the first depth iteration of the convolution, the updated depth hardware execution parameter to configure the hardware accelerator circuitry to perform a second depth iteration of the convolution.

14. The non-transitory computer readable storage medium as defined in claim 9, wherein the instructions are further to cause the controller to:
generate an updated horizontal hardware execution parameter when the hardware accelerator circuitry completes a horizontal iteration;
generate an updated vertical hardware execution parameter when the hardware accelerator circuitry completes a vertical iteration of the convolution;
configure the updated horizontal hardware execution parameter in the hardware accelerator circuitry to perform a second horizontal iteration of the convolution; and
configure the updated vertical hardware execution parameter in the hardware accelerator circuitry to perform a second vertical iteration of the convolution.

15. The non-transitory computer readable storage medium as defined in claim 9, wherein the instructions are further to cause the controller to generate the kernel parameter based on the layer parameter of the input tensor.

16. A method to perform a convolution on an input tensor, the method comprising:
generating a horizontal hardware execution parameter for a horizontal dimension of the input tensor based on at least one of a kernel parameter or a layer parameter;
generating a vertical hardware execution parameter for a vertical dimension of the input tensor based on at least one of the kernel parameter or the layer parameter;
configuring hardware accelerator circuitry based on the horizontal and vertical hardware execution parameters;
determining when the hardware accelerator circuitry completes a first horizontal iteration of the convolution; and
determining when the hardware accelerator circuitry completes a first vertical iteration of the convolution.

17. The method as defined in claim 16, wherein the layer parameter includes an input dimension sizes parameter of the input tensor, the kernel parameter includes a tile dimension sizes parameter of a tile of the input tensor, the configuring of the hardware accelerator circuitry based on an input depth size parameter of a micro-tile of the tile.

18. The method as defined in claim 16, wherein the horizontal hardware execution parameter is to configure the hardware accelerator circuitry to perform the first horizontal iteration of the convolution, and the vertical hardware execution parameter is to configure the hardware accelerator circuitry to perform the first vertical iteration of the convolution.

19. The method as defined in claim 16, further including:
generating a depth hardware execution parameter for a depth dimension of a micro-tile of the input tensor based on at least one of the kernel parameter or the layer parameter; and
configuring the hardware accelerator circuitry to perform the convolution based on the depth hardware execution parameter.

20. The method as defined in claim 19, further including:
determining when the hardware accelerator circuitry completes a first depth iteration of the convolution; and
generating an updated depth hardware execution parameter when the hardware accelerator circuitry completes the first depth iteration of the convolution, the updated depth hardware execution parameter to configure the hardware accelerator circuitry to perform a second depth iteration of the convolution.

21. The method as defined in claim 16, further including:
generating an updated horizontal hardware execution parameter when the hardware accelerator circuitry completes a horizontal iteration;
generating an updated vertical hardware execution parameter when the hardware accelerator circuitry completes a vertical iteration of the convolution;
configuring the updated horizontal hardware execution parameter in the hardware accelerator circuitry to perform a second horizontal iteration of the convolution; and
configuring the updated vertical hardware execution parameter in the hardware accelerator circuitry to perform a second vertical iteration of the convolution.

22. The method as defined in claim 16, further including generating the kernel parameter based on the layer parameter of the input tensor.

23. An apparatus to perform a convolution on an input tensor, the apparatus comprising:
means for generating parameters to:
generate a horizontal hardware execution parameter for a horizontal dimension of the input tensor based on at least one of a kernel parameter or a layer parameter; and
generate a vertical hardware execution parameter for a vertical dimension of the input tensor based on at least one of the kernel parameter or the layer parameter;
means for configuring means for performing convolutions based on the horizontal and vertical hardware execution parameters;

means for controlling a horizontal iterator to determine when the means for performing convolutions completes a first horizontal iteration of the convolution; and means for controlling a vertical iterator to determine when the means for performing convolutions completes a first vertical iteration of the convolution.

24. The apparatus of claim 23, wherein the layer parameter includes an input dimension sizes parameter of the input tensor, the kernel parameter includes a tile dimension sizes parameter of a tile of the input tensor, the means for configuring to use an input depth size parameter of a micro-tile of the tile to configure the means for performing convolutions.

25. The apparatus of claim 23, wherein the horizontal hardware execution parameter is to configure the means for performing convolutions to perform the first horizontal iteration of the convolution, and the vertical hardware execution parameter is to configure the means for performing convolutions to perform the first vertical iteration of the convolution.

26. The apparatus of claim 23, wherein:

the means for generating parameters is to generate a depth hardware execution parameter for a depth dimension of a micro-tile of the input tensor based on at least one of the kernel parameter or the layer parameter; and the means for configuring the means for performing convolutions is to configure the means for performing convolutions to perform the convolution based on the depth hardware execution parameter.

27. The apparatus of claim 26, further including means for controlling a depth iterator to determine when the means for performing convolutions completes a first depth iteration of the convolution, the means for generating parameters to generate an updated depth hardware execution parameter when the means for performing convolutions completes the first depth iteration of the convolution, the updated depth hardware execution parameter to configure the means for performing convolutions to perform a second depth iteration of the convolution.

28. The apparatus of claim 23, wherein:

the means for generating parameters is further to:

generate an updated horizontal hardware execution parameter when the means for performing convolutions completes the first horizontal iteration of the convolution; and generate an updated vertical hardware execution parameter when the means for performing convolutions completes the first vertical iteration of the convolution; and means for configuring the means for performing convolutions is to:

configure the updated horizontal hardware execution parameter in the means for performing convolutions to perform a second horizontal iteration of the convolution; and configure the updated vertical hardware execution parameter in the means for performing convolutions to perform a second vertical iteration of the convolution.

29. The apparatus of claim 23, further including means for generating the kernel parameter based on the layer parameter of the input tensor.

* * * * *